US012585468B2

(12) United States Patent
Kiss et al.

(10) Patent No.: US 12,585,468 B2
(45) Date of Patent: Mar. 24, 2026

(54) APPARATUS AND METHOD USING HINT CAPABILITY FOR CONTROLLING MICRO-ARCHITECTURAL CONTROL FUNCTION

(71) Applicant: Arm Limited, Cambridge (GB)

(72) Inventors: Dániel Kristóf Kiss, Pomáz (HU); Ruben Borisovich Ayrapetyan, St. Neots (GB)

(73) Assignee: Arm Limited, Cambridge (GB)

( * ) Notice: Subject to any disclaimer, the term of this patent is extended or adjusted under 35 U.S.C. 154(b) by 36 days.

(21) Appl. No.: 18/702,959

(22) PCT Filed: Sep. 7, 2022

(86) PCT No.: PCT/GB2022/052270
§ 371 (c)(1),
(2) Date: Apr. 19, 2024

(87) PCT Pub. No.: WO2023/073337
PCT Pub. Date: May 4, 2023

(65) Prior Publication Data
US 2025/0258675 A1 Aug. 14, 2025

(30) Foreign Application Priority Data
Oct. 29, 2021 (GB) ..................................... 2115558

(51) Int. Cl.
*G06F 9/30* (2018.01)
*G06F 9/38* (2018.01)
*G06F 12/0862* (2016.01)

(52) U.S. Cl.
CPC ........ *G06F 9/30181* (2013.01); *G06F 9/3802* (2013.01); *G06F 9/383* (2013.01); *G06F 12/0862* (2013.01)

(58) Field of Classification Search
CPC .......................... G06F 9/30181; G06F 9/30036
See application file for complete search history.

(56) References Cited

U.S. PATENT DOCUMENTS

| | | | |
|---|---|---|---|
| 7,457,923 B1 | 11/2008 | Chou et al. | |
| 2018/0225120 A1* | 8/2018 | Barnes ..................... | G06F 21/52 |

(Continued)

FOREIGN PATENT DOCUMENTS

| | | | |
|---|---|---|---|
| GB | 2541714 A | 3/2017 | |
| GB | 2544474 A | 5/2017 | |
| GB | 2572954 A * | 10/2019 | ......... G06F 12/0862 |

OTHER PUBLICATIONS

Combined Search and Examination Report for an International Application No. GB2115558.5, dated Jun. 29, 2022.

(Continued)

*Primary Examiner* — Courtney P Spann
(74) *Attorney, Agent, or Firm* — NIXON & VANDERHYE P.C.

(57) ABSTRACT

Capability storage circuitry 30, 32, 60, 34 stores at least one capability specifying a capability value and capability metadata indicative of constraints on valid use of the capability value. Capability checking circuitry 44 determines whether a capability-controlled operation to be performed by the processing circuitry with reference to a target capability is allowed, based on whether the capability-controlled operation satisfies the constraints indicated by the capability metadata of the target capability, and triggers an error handling response when the constraints are not satisfied. Micro-architectural control circuitry 40, 42, 23 controls a micro-architectural control function, other than determining whether the capability-controlled operation is allowed, depending on the capability metadata specified by a hint capability used to provide a hint to the micro-architectural control function.

19 Claims, 7 Drawing Sheets

(56) References Cited

U.S. PATENT DOCUMENTS

| 2020/0117458 A1* | 4/2020 | Barnes | G06F 9/30054 |
|---|---|---|---|
| 2023/0195461 A1* | 6/2023 | LeMay | G06F 9/3013 |
| | | | 712/208 |
| 2023/0315452 A1* | 10/2023 | Constable | G06F 12/0862 |
| | | | 712/207 |

OTHER PUBLICATIONS

International Search Report and Written Opinion for an International Application No. PCT/GB2022/052270 dated Dec. 13, 2022.
Woodruff et al., "CHERI Concentrate: Practical Compressed Capabilities," p. 1-15.
Watson et al., "An Introduction to CHERI," University of Cambridge, computer Laboratory, Technical report, Sep. 2019, p. 1-43.
Watson et al., "Capability Hardware Enhanced RISC Instructions: CHERI Instruction-Set Architecture," Version 7, University of Cambridge, computer Laboratory, Technical report, Sep. 2019, p. 1-496.
Arm® Architecture Reference Manual Supplement Morello for A-profile Architecture, 2019-2021 Arm Limited.

* cited by examiner registers 14
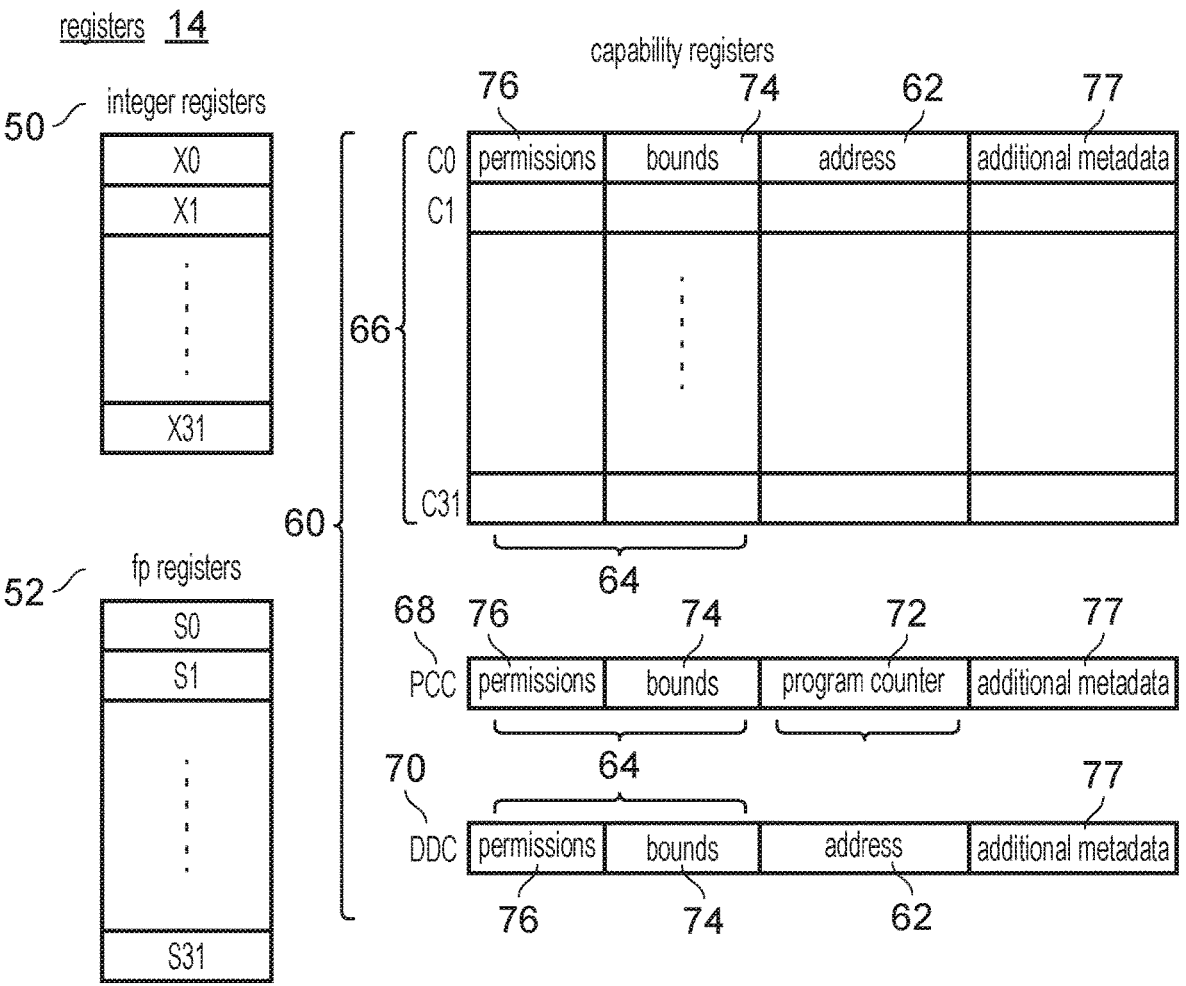
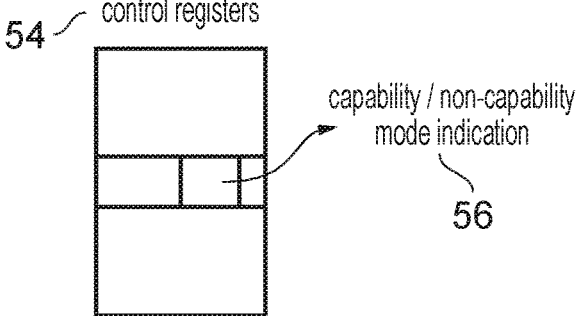
FIG. 2

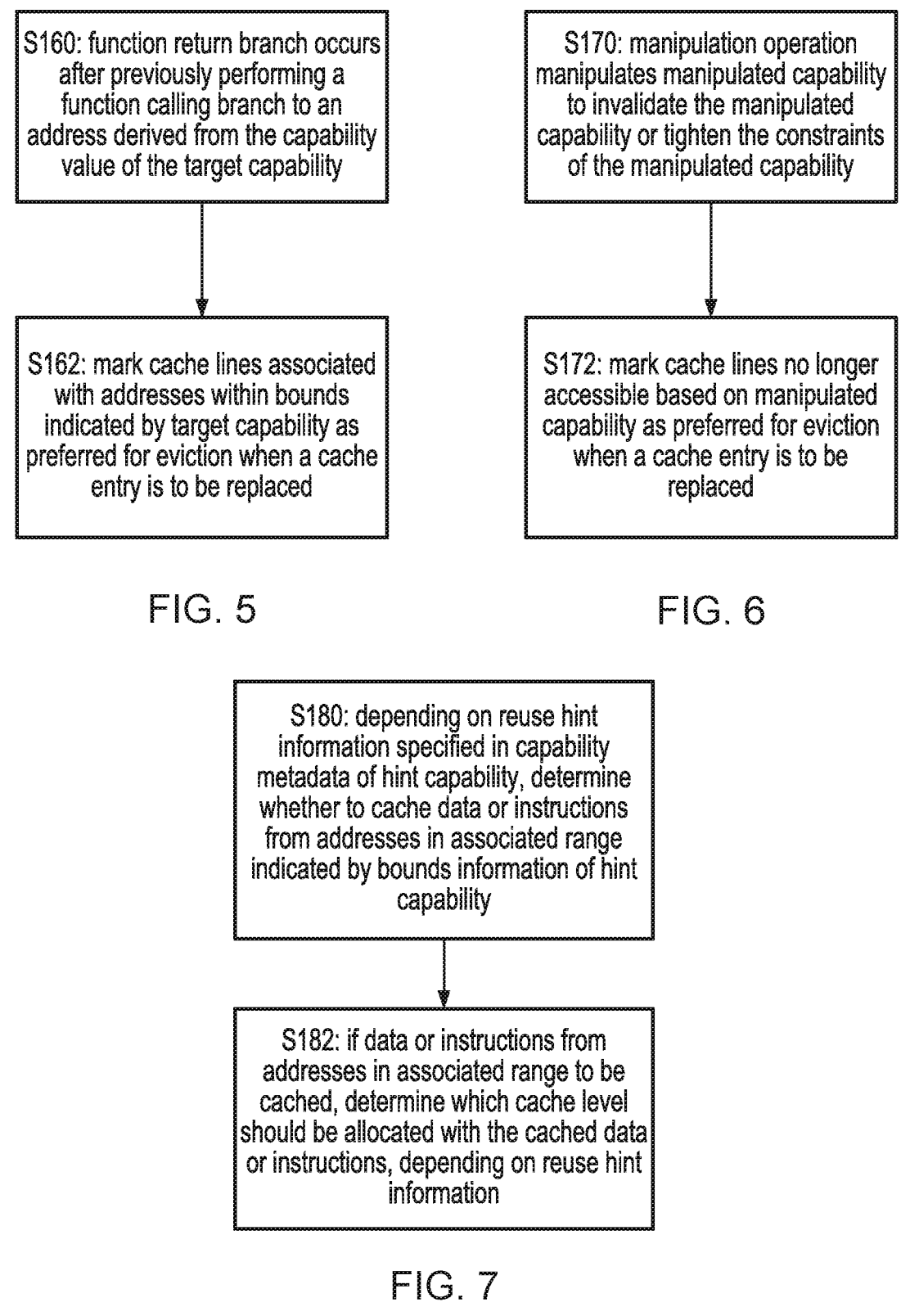

S160: function return branch occurs after previously performing a function calling branch to an address derived from the capability value of the target capability

↓

S162: mark cache lines associated with addresses within bounds indicated by target capability as preferred for eviction when a cache entry is to be replaced

FIG. 5

S170: manipulation operation manipulates manipulated capability to invalidate the manipulated capability or tighten the constraints of the manipulated capability

↓

S172: mark cache lines no longer accessible based on manipulated capability as preferred for eviction when a cache entry is to be replaced

FIG. 6

S180: depending on reuse hint information specified in capability metadata of hint capability, determine whether to cache data or instructions from addresses in associated range indicated by bounds information of hint capability

↓

S182: if data or instructions from addresses in associated range to be cached, determine which cache level should be allocated with the cached data or instructions, depending on reuse hint information

FIG. 7

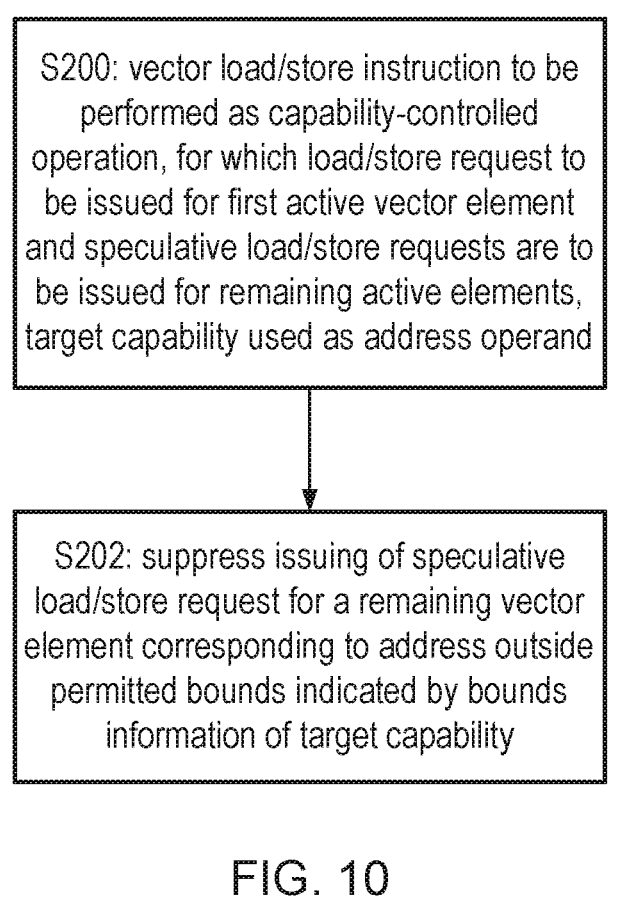

S200: vector load/store instruction to be performed as capability-controlled operation, for which load/store request to be issued for first active vector element and speculative load/store requests are to be issued for remaining active elements, target capability used as address operand S202: suppress issuing of speculative load/store request for a remaining vector element corresponding to address outside permitted bounds indicated by bounds information of target capability

FIG. 10

APPARATUS AND METHOD USING HINT CAPABILITY FOR CONTROLLING MICRO-ARCHITECTURAL CONTROL FUNCTION

The present technique relates to the field of data processing.

Software to be executed by a data processing apparatus may typically be written in a high-level programming language and then compiled into program code according to the instruction set architecture supported by the apparatus on which the software is to be executed. For example, the software may originally be written in a higher level language such as Java®, C or C++, and then compiled into a natively supported instruction set architecture such as x86 or AArch64 provided by Arm®.

Some higher level programming languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled program code according to a given instruction set architecture, there may be a large number of memory related errors, such as bounds violations, where an array index supplied by program code is outside legitimate bounds of an array, use-after-free errors where an access to a memory location is made after that memory location has already been deallocated or freed for use for another purpose, use-after-return where a memory access to an address associated with a variable used within a function is made after already returning from the function, and so on. Such errors may be vulnerable to exploitation by a malicious party or may cause the program to fail in unpredictable ways.

Memory protection techniques currently in use tend to be relatively coarse-grained in that access permissions for respective regions of memory tend to be defined at the level of an individual process or thread accessing a page of virtual memory, rather than being tied to a particular access to program code or data objects being performed within a thread or process.

In a capability-based architecture, capability storage may be provided to store capabilities, where a capability comprises a capability value (e.g. an address) and capability metadata indicating constraints on valid use of the capability value or the capability. This approach means that when a particular capability is referenced to perform a particular data or instruction access, the associated metadata for constraining that access is provided in the capability itself. Different accesses to the same address from different instructions within the same process can reference different capabilities and hence be subject to different constraints. This can enable more fine-grained compartmentalisation of software running on the processing circuitry, making it harder for attackers to exploit memory usage errors. Capabilities can also be used for controlling whether other types of capability-controlled operation, other than a memory access, are allowed, so the capability value could also be a data value other than an address.

At least some examples provide an apparatus comprising: processing circuitry to perform data processing in response to instructions; capability storage circuitry to store at least one capability, each capability specifying a capability value and capability metadata indicative of constraints on valid use of the capability value; capability checking circuitry to determine whether a capability-controlled operation to be performed by the processing circuitry with reference to a target capability is allowed, based on whether the capability-controlled operation satisfies the constraints indicated by the capability metadata of the target capability, and to trigger an error handling response when the capability-controlled operation fails to satisfy the constraints indicated by the capability metadata of the target capability; and micro-architectural control circuitry to control a micro-architectural control function, other than determining whether the capability-controlled operation is allowed, depending on the capability metadata specified by a hint capability used to provide a hint to the micro-architectural control function.

At least some examples provide a method for an apparatus comprising processing circuitry to perform data processing in response to instructions and capability storage circuitry to store at least one capability, each capability specifying a capability value and capability metadata indicative of constraints on valid use of the capability value; the method comprising: determining whether a capability-controlled operation to be performed by the processing circuitry with reference to a target capability is allowed, based on whether the capability-controlled operation satisfies the constraints indicated by the capability metadata of the target capability; triggering an error handling response when the capability-controlled operation fails to satisfy the constraints indicated by the capability metadata of the target capability; and controlling a micro-architectural control function, other than determining whether the capability-controlled operation is allowed, depending on the capability metadata specified by a hint capability used to provide a hint to the micro-architectural control function.

At least some examples provide a computer-readable medium to store computer-readable code for fabrication of an apparatus comprising: processing circuitry to perform data processing in response to instructions; capability storage circuitry to store at least one capability, each capability specifying a capability value and capability metadata indicative of constraints on valid use of the capability value; capability checking circuitry to determine whether a capability-controlled operation to be performed by the processing circuitry with reference to a target capability is allowed, based on whether the capability-controlled operation satisfies the constraints indicated by the capability metadata of the target capability, and to trigger an error handling response when the capability-controlled operation fails to satisfy the constraints indicated by the capability metadata of the target capability; and micro-architectural control circuitry to control a micro-architectural control function, other than determining whether the capability-controlled operation is allowed, depending on the capability metadata specified by a hint capability used to provide a hint to the micro-architectural control function. The computer-readable medium may be a non-transitory computer-readable medium.

Further aspects, features and advantages of the present technique will be apparent from the following description of examples, which is to be read in conjunction with the accompanying drawings, in which:

FIG. 2 illustrates an example of capabilities stored in capability registers;

FIGS. 5-7 show various examples of controlling cache allocation or replacement based on capability metadata of a hint capability;

FIG. 10 illustrates using bounds information of a target capability, used as an address operand for a vector load/store instruction, to control issuing of speculative load/store requests.

Figure 1:
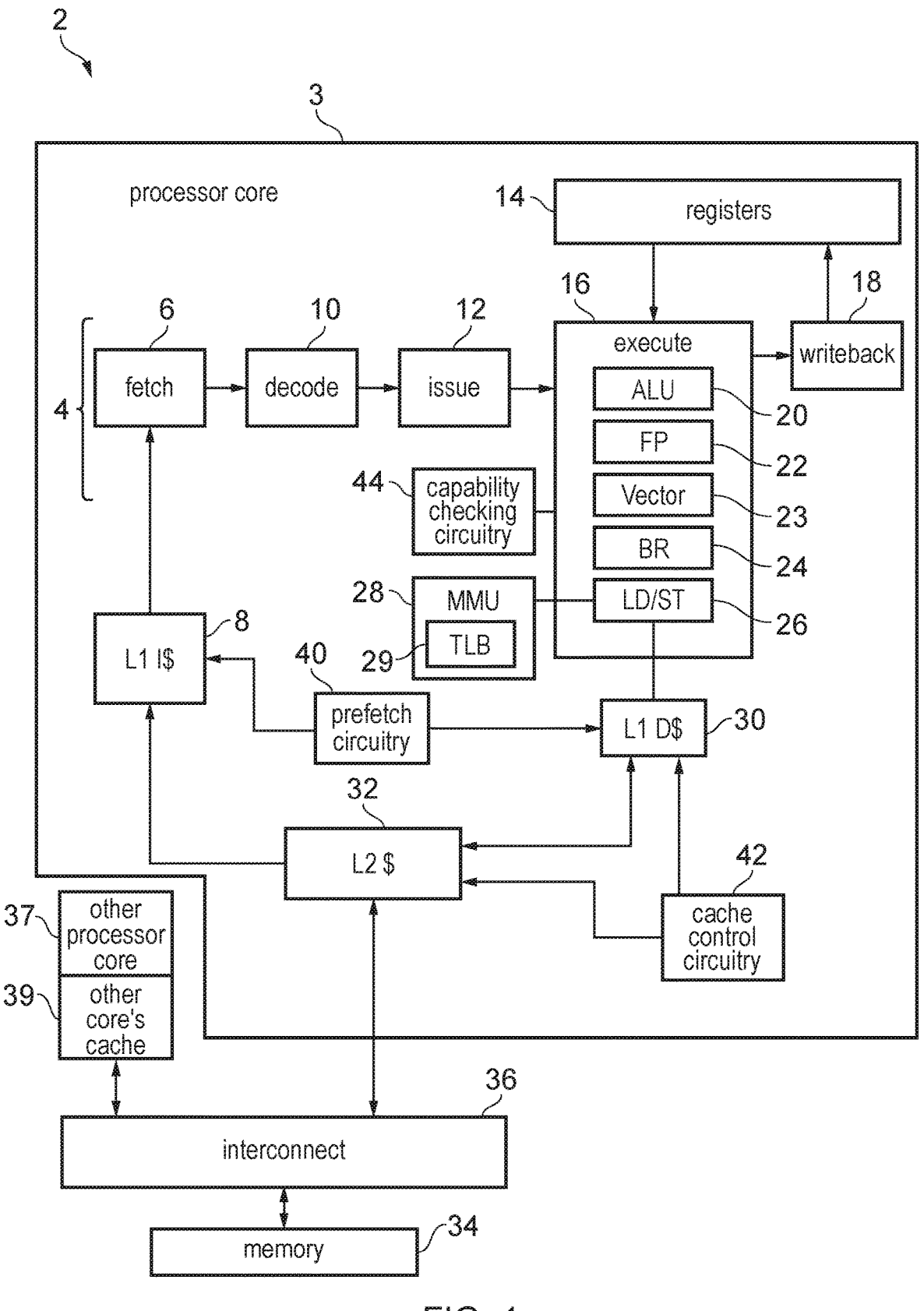
FIG. 1 illustrates an example of a data processing apparatus having capability checking circuitry.

An apparatus has processing circuitry to perform data processing in response to instructions. The instructions may be processed according to a particular instruction set architecture (ISA). The ISA defines a set of features which software can expect to be supported by the apparatus, so that software defined according to the rules defined by the ISA can be expected to execute with equivalent functional results on any processor supporting that ISA. For example, the ISA may define the operations to be supported by the processing circuitry, the encoding of the instructions used to control the processing circuitry to perform those operations, the registers provided for access by instructions, and rules and control structures for controlling memory management and exception handling for example. Within the constraints imposed by the ISA, a designer of the circuit hardware for a particular processing platform may have considerable flexibility as to how to implement the circuitry for implementing the requirements of the ISA. Processor design features which are not explicitly required by the ISA, or for which the specific design can vary from one platform to another among processors supporting the ISA, may be referred to as "micro-architectural" features. For example, the micro-architectural features could vary depending on the design goals for a particular processor implementation. Micro-architectural features could include the specific arrangement of pipeline stages in a processing pipeline, the particular set of execute units supported (e.g. how many instances of a given type of execute units are provided in parallel, whether optional units such as vector processing units are supported), details of how particular architectural instructions are processed (e.g. whether certain more complex operations defined in the ISA are split into separate simpler operations scheduled for execution separately, or are performed as a more complex fused operation), the implementation of one or more caches (e.g. different implementations may have caches with different sizes or associativity or could have different numbers of levels of caches in a cache hierarchy), and/or the implementation of various prediction mechanisms for predicting future events that may occur during processing of a given program and triggering speculative actions based on those predictions (such as branch predictors, prefetchers, etc.). One implementation may prefer to prioritise high performance and so could choose a micro-architectural implementation which includes several performance-enhancing mechanisms and which tailors the design of a processing pipeline, caches and prediction mechanisms to try to achieve higher performance even if this incurs some additional cost in terms of power consumption. Other implementations may prefer to prioritise energy efficiency. These implementations may support the same ISA and so may be capable of executing exactly the same software code, but when doing so may achieve different levels of performance and energy efficiency on the different micro-architectural implementations.

Processing circuitry supporting a capability architecture may support the use of capabilities which can be used as operands for capability-controlled operations performed by the processing circuitry. Capability storage circuitry stores at least one capability, each capability specifying a capability value and capability metadata indicative of constraints on valid use of the capability value. Capability checking circuitry determines whether a capability-controlled operation to be performed by the processing circuitry with reference to a target capability is allowed, based on whether the capability-controlled operation satisfies the constraints indicated by the capability metadata of the target capability, and triggers an error handling response when the capability-controlled operation fails to satisfy the constraints indicated by the capability metadata of the target capability. This provides a mechanism for fine-grained control over operations performed by the processing circuitry, since two different instructions executed within the same software process can reference different capabilities and hence be subject to different constraints on the operations they are allowed to perform, in contrast to standard memory management based access control techniques where either all instructions within a given software process may be subject to the same permissions, or frequent rewriting of page table permissions may be needed to provide more fine-grained control, which may have an impact on performance.

In typical processors supporting access control based on capabilities, the capability metadata of a given capability may be used only for the architecturally-defined purpose of checking whether a capability-controlled operation is allowed, as prescribed by the ISA supported by the processor. While there may be some micro-architectural design decisions in implementing the capability checking circuitry for determining whether a capability-controlled operation to be performed by the processing circuitry is allowed, the metadata of the target capability used for checking that capability-controlled operation would not generally be used for other purposes beyond checking capability-controlled operations are allowed.

However, the inventors have recognised that the information provided by capability metadata in a capability can be used as hint information for one or more micro-architectural control functions other than a function of determining whether the capability-controlled operation is allowed. For example, the capability metadata can be used as a hints for a performance optimisation or an energy-saving function. This is possible because the capability metadata may give clues as to the operations likely to be required in future when executing operations under control of the capability. The metadata of a capability gives more meaning and information about the type of information accessed using the capability (e.g. whether the information is data, an address pointer, or program code), which would not be the case for classic non-capability operands where the meaning of the information accessed using the capability would be unknown until it is actually used. Hence, by re-using the capability metadata for purposes other than those defined in the architecture, to control a micro-architectural control function other than determining whether the capability-controlled operation is allowed, this can enable a processing platform to achieve higher performance and/or reduce power consumption.

In general, the micro-architectural control function may be controlled depending on the capability metadata specified by a hint capability used to provide a hint to the micro-architectural control function. Various capabilities could be used as the hint capability. For example, the hint capability may be at least one of: the target capability referenced in the capability-controlled operation; a loaded capability loaded to the capability storage circuitry; and a manipulated capability manipulated by an operation performed by the processing circuitry.

For example, when performing a capability-controlled operation, the target capability referenced in the capability-controlled operation can be used as the hint capability. When the capability-controlled operation is a memory access, for example, the target capability may define an allowable address range or set of operation types permitted to be performed, which can give clues as to other operations which may later be requested based on the target capability and hence provide useful hints to micro-architectural control functions.

Another instance when hints can be derived from capability may be when a capability is loaded to the capability storage circuitry. The capability storage circuitry could include capability registers and/or one or more caches. In some cases, when loading a capability to the capability registers, the capability metadata of the loaded capability could be checked and used to provide a hint to a micro-architectural control function, since the fact that the capability is being loaded may be a hint that operations may later be performed with reference to that capability and hence the capability metadata may indicate properties of operations likely to occur in future which can be useful for controlling micro-architectural functions. Similarly, when loading a capability from main memory to a cache, the capability metadata of the loaded capability could also be used as hint information for a micro-architectural control function.

Another occasion when a capability could provide useful hints is when a capability is manipulated by an operation performed by the processing circuitry. For example, the manipulation could comprise invalidating the capability, or narrowing the bounds or range of permissions defined by the capability so as to tighten the constraints imposed by the capability metadata. When a capability is manipulated, this may result in some operations, which would previously have been permitted, to no longer be permitted, and so this may provide a hint to a micro-architectural function that some items of stored state may no longer be required (for example cache entries or prediction state entries associated with no longer permitted addresses or operations could be discarded). Hence, the capability metadata of a manipulated capability could also provide useful hint information for a micro-architectural control function.

A capability may specify different types of capability metadata, any of which may be used as the hint information for the micro-architectural control function. For example, the capability metadata may comprise bounds information specifying permitted bounds for the capability value or bounds for a value derived from the capability value. The micro-architectural control circuitry may use the bounds information of the hint capability to control the micro-architectural control function. For example the permitted bounds may specify a range within which an address derived from the capability value is allowed to reside in order for a capability-controlled memory access operation referencing that capability to be allowed, which can provide information on future addresses which may be accessed, and hence useful hints for various micro-architectural control functions.

Another type of capability metadata defined for a given capability may be permissions information specifying permitted types of capability-controlled operation permitted to be performed with reference to the given capability. For example, where the capability value is an address operand used to derive an address of a memory access, the permissions information may specify whether that address is allowed to be used for a read operation, a write operation or an instruction fetch operation, for example. Again, the permissions information can provide useful hints as to what types of operations may be required in future, which can help to more efficiently manage micro-architectural resources such as cache capacity or prediction training resources.

The bounds information and permissions information may be examples of architecturally-defined metadata which have a meaning defined by the instruction set architecture supported by the processing circuitry. For example, the ISA may prescribe how the bounds information and permissions information are to be used for checking whether or not a given capability-controlled operation is allowed.

However, the capability metadata may also comprise software-controlled metadata or implementation-specific metadata, other than architecturally-defined metadata having a meaning defined by an instruction set architecture supported by the processing circuitry.

For example, an ISA may reserve some encoding space in a capability for software-controlled metadata which software can define arbitrarily to suit its own purposes. While the hardware may not be aware of the meaning of that software-controlled metadata, it can be useful for software to be able to stash some additional information in the capability as this may allow that information to benefit from mechanisms supported by the ISA for ensuring that the capability metadata is retained when a capability is transferred to or from memory and mechanisms defined in the ISA for attesting that the metadata of a given capability has been correctly formed through a trusted process. Hence, in some implementations software could write the software-controlled metadata to a given capability to provide an explicit hint to hardware as to the nature of the operations likely to be performed using that capability, and micro-architectural control circuitry may then use that software-controlled metadata to control a micro-architectural control function other than determining whether a capability-controlled operation is allowed.

Alternatively, some processor implementations may, in hardware, be able to monitor operations performed when executing a piece of software to learn hint information about the requirements of that software, which could be written as implementation-specific metadata to the capability metadata of a given capability. For example, the implementation-specific metadata generated by the hardware could be written to the field reserved for software-controlled metadata or could be written to a further field of the capability which may not be defined in the ISA but may be stored in non-architecturally-visible storage which expands the size of the capability beyond the size defined in the ISA. Micro-architectural control circuitry could use that implementation-specific metadata to obtain hints as to future operations likely to be performed at hence use this to control the micro-architectural control function. Where implementation-specific metadata is provided, when a given capability comprising implementation-specific metadata is written back to main memory from a register or cache, some implementations may retain the implementation-specific metadata and write it to memory so that when the given capability is later loaded back to the register or the cache the implementation-specific metadata previously obtained may still be available to provide hints to the micro-architectural control circuitry. However, other implementations may choose to discard the implementation-specific metadata when a given capability is written back to memory from a register or a cache. Such implementations may assume that if the given capability is being written back to memory then it may not have been used recently and so any information derived from monitoring operations performed by the processing circuitry in order to set the implementations-specific metadata may no longer be current and so it may be preferable to prevent it from being written back to memory to avoid micro-architectural control functions performed based on the capability at a later time using out of date hints.

In some examples, the control of the micro-architectural control function may also depend on the capability value of the hint capability, not just the capability metadata. For example, where the capability value is an address and the bounds information indicates an allowable range for the address, the micro-architectural control circuitry may determine that future operations are more likely to use addresses within the upper part of the allowable range between the address indicated by the capability value and the upper bound of the allowable range, and so the micro-architectural control function (e.g. prefetching or caching) may focus on prioritising operations that would tend to make loads or instruction fetches from addresses in that upper part of the range more efficient. Similarly, addresses in the lower part of the range between the lower address bound and the address indicated by the capability value could be deprioritised for prefetching/caching compared to addresses in the upper part of the range (e.g. addresses in the lower part of the range could be prioritised for eviction from a cache as it may be assumed that the pointer represented by the hint capability has already advanced past the addresses in the lower part of the range and so those addresses are less likely to be accessed again). Hence, while some examples below discuss controlling a micro-architectural control function based on the capability metadata of the hint capability, this does not exclude also considering the capability value of the hint capability when controlling the micro-architectural control function.

A wide variety of micro-architectural control functions could be controlled based on the hint information derived from the capability metadata of the hint capability. For example, the hint information could influence caching decisions, prediction mechanisms and decisions on which parts of a processing operation might be suppressed to save energy.

One example of a class of micro-architectural control functions for which the technique can be particularly useful may be a speculation control function for controlling performance of at least one speculative operation depending on the capability metadata of the hint capability. As the capability metadata may provide hints as to future intent, this can be very useful for controlling speculative operations as by considering the capability metadata when controlling the performance of speculative operations, it may be more likely that any speculation made is correct, which will tend to improve performance and save power.

One particular example of a micro-architectural control function for which the capability metadata of a hint capability may provide particularly useful hints may be prefetching performed by prefetch circuitry to prefetch data or instructions to at least one cache. Typically, the most common use of capabilities may be to police accesses to memory, and so the capability metadata may typically be defined to indicate bounds on the addresses and access types of future memory accesses permitted. Hence, the capability may specify bounds on accesses expected in future, which can be useful to improve predictions of future access patterns, so that it is more likely that when a subsequent memory access is actually required, the corresponding information is already in a cache so that it can be accessed faster, improving performance.

For example, the prefetch circuitry may identify, based on the bounds information of the hint capability, a range of addresses from which to prefetch data or instructions. Typically, the bounds information of a given capability may be defined by software to correspond with the bounds of a region of memory from which program instructions are to be executed or data is to be accessed, and so this may express intent for future operations to be performed by the software. By training the prefetcher predictions based on the range specified by the bounds information of the hint capability, this can help to improve prefetcher coverage.

The permissions information of the hint capability, which specifies permitted types of capability-controlled operation, can also be useful for controlling prefetching. For example, the prefetch circuitry may select, depending on the permissions information of the hint capability, whether to perform data prefetching or instruction prefetching. Data prefetching and instruction prefetching could differ in various ways, for example differing in which destination cache is allocated with the prefetched information (e.g. selecting whether to prefetch into a data cache or an instruction cache), or differing in terms of the state in which allocated information is stored in the cache (e.g. entries in a shared cache shared for instructions/data could be marked to distinguish whether they hold instructions or data, or could have replacement or cache coherency operations controlled in different ways). Hence, it can be useful for the prefetcher to know whether a particular address is likely to be used for data access or an instruction fetch. The permitted types of operation indicated by the permissions information of the hint capability can provide useful hints as to the likely use of a given address, and so this may help the prefetcher to improve its predictions and hence improve performance.

For example, the permissions information of a given capability may specify one or more of:

an execute permission indicating that the given capability grants permission to execute instructions from an associated address range indicated by bounds information of the given capability;

a read permission indicating that the given capability grants permission to read data at the associated address range; and a write permission indicating that the hint capability grants permission to write data at the associated address range.

Often it may be safest not to allow a given capability to specify both an execute permission and write permission for a given address, to avoid program code being overwritten. Some software may prefer to grant the regions of memory storing executable program code the execute permission only and not provide the read and write permissions, to prevent the program code being readable or writeable by the software being controlled based on the capability. It will be appreciated that these are just some examples of possible permissions that can be supported by the capability metadata.

Hence, where prefetch circuitry controls prefetching based on the permissions information of a hint capability, in some examples: in response to determining that the permissions information of the hint capability specifies an execute permission indicating that the hint capability grants permission to execute instructions from an associated address range indicated by bounds information of the hint capability, the prefetch circuitry is configured to perform instruction prefetching; and in response to determining that the permissions information of the hint capability specifies a read or write permission indicating that the hint capability grants permission to read or write data at the associated address range, the prefetch circuitry is configured to perform data prefetching. If the hint capability does not provide the execute permission, instruction prefetching for the associated address range can be suppressed by the prefetch circuitry. Similarly, if the hint capability does not provide the read or write permission, data prefetching for the associated address range can be suppressed by the prefetch circuitry. By tailoring the type of prefetching to the permission specified by the hint capability, prefetch coverage can be improved and hence better performance and higher energy efficiency can be achieved.

Another example of a micro-architectural control function that can be controlled based on the capability metadata of the hint capability may be control of allocation or replacement of entries in at least one cache. Hence, the micro-architectural control circuitry may comprise cache control circuitry to control allocation or replacement of entries in at least one cache, depending on the capability metadata specified by the hint capability (and optionally also depending on the capability value). Again, as the capability metadata may provide hints as to which addresses may be accessed in future, this can provide useful information for deciding how to allocate/replace entries in a cache to try to ensure the retained entries are those most likely to be needed and/or avoid expending resource on information likely not to be needed.

For example, the cache control circuitry may select, based on the permissions information of the hint capability, a coherency state to be used for allocation of a given cache entry associated with an address in an associated address range indicated by the bounds information of the hint capability. The processing circuitry may be one of a plurality of processor cores having respective caches. The caches may be subject to a coherency protocol which aims to ensure that, when data from a given address is shared between multiple requesters which may each cache respective instances of the data, a request made by a given requester for data from a given address may return the most up-to-date data taking into account any updates made by other requesters. In such a coherency protocol, the coherency management operations required when a given requester intends to write to a given address may be more onerous than the coherency management operations required when the given requester only needs to read the given address, since before being able to write to a given address it may need to be checked whether the requester has permission to write, considering that other caches could hold corresponding copies of the data which may need to be invalidated to ensure that out of data copies are not retained after the given requester performs its write. Such checks could be omitted if it is known that a given requester only needs to read the data and will never write, but in previous techniques the future intent of the software may not be known and so on requesting a read to a given address the checks for obtaining write permission might be performed anyway just in case a future write is required. This can harm performance because the write checks may delay the data becoming available in the caches of the given requester, and also could unnecessarily trigger invalidation of corresponding data from other requesters caches which might be unnecessary if the given requester never needs to write the data, and which may cause knock-on performance reduction at those other requesters as they no longer have the data available in their caches. In contrast, when capability metadata is available from a hint capability, the types of permission specified in the capability metadata may indicate whether data from a given address range is likely to be written, and so this could be used to control the coherency state to use for a given cache entry associated with a given address within the associated address range of the hint capability.

For example, where the processing circuitry is one of a plurality of processor cores, and the cache control circuitry is configured to control allocation or replacement of entries in at least one cache of that one of the plurality of processor cores, in response to determining that the permission information of the hint capability specifies a write permission indicating that the hint capability grants permission to write to addresses in the associated address range, the cache control circuitry may allocate the given cache entry in an exclusive or modified coherency state indicating that subsequent writes to the given cache entry are allowed to be performed without checking whether at least one other cache of another processor core holds data for a corresponding address (the exclusive state may indicate that the cached data is clean so does not need to be written back to memory on eviction from the cache, while the modified state may indicate that the cached data is dirty so does need to be written back to memory on eviction from the cache). In response to determining that the permission information of the hint capability specifies that permission is granted to read from addresses in the associated address range but permission is denied for writing to addresses in the associated address range, the cache control circuitry is configured to allocate the given cache entry in a shared coherency state indicating that subsequent reads to the given cache entry are allowed to be performed without checking whether at least one other cache of another of the plurality of processor cores holds data for a corresponding address, but subsequent writes to the given cache entry would require a check of whether at least one other cache of another processor core holds data for the corresponding address. Allocating the cache entry in the shared coherency state may be more efficient as it can avoid needing to request invalidation of corresponding data in other caches subject to the coherency protocol at the time of bringing the data into the cache (in the case when the only subsequent access requests to the address associated with the cache entry are read operations, the invalidation can be avoided altogether—in response to a subsequent write request is received to an entry in the shared coherency state, a request would be sent to request invalidation data held for the same address in other processor core's caches). Hence, considering the hint capability's permissions when controlling the type of request sent when allocating data into a cache can improve performance when the hint capability provides the hint that data from a given address will only be used for read-only accesses, as it reduces the likelihood of data being invalidated from another core's cache unnecessarily.

In other words, the cache control circuitry of one processor core, when seeing the "read-no-write permission" of the hint capability, deduces that there would unlikely be any writes to the memory region and decides to allocate the cache entry in the shared state rather than in exclusive state which means it doesn't ask other cores to invalidate their copies of the cache entries. In the alternative scenario, when the cache control circuitry sees that there is a write permission for the hint capability, it determines that there would likely be a write to the cache entry soon, and so it requests a copy of the cache entry from other caches and invalidation of the entry in the other caches at the same time, and subsequently allocates the cache entry as exclusive or modified.

Another aspect of cache control that may depend on the capability metadata may be the selection of a victim entry to be replaced in the at least one cache. For example, sometimes an operation performed on a given capability may indicate that the corresponding address range will no longer be used by the software for valid memory accesses and so this could be used to identify that corresponding cache entries could be prioritised for eviction, making it more likely that when making replacement decisions, the entries retained in the cache are those most useful for future then we accesses, improving performance.

For example, when the capability-controlled operation is a function-calling branch operation to branch to function code at an address derived from the capability value of the target capability, in response to a subsequent function return branch to return from processing of the function code, the cache control circuitry may prioritise for replacement one or more entries of the at least one cache associated with one or more addresses in a range indicated by bounds information specified by the capability metadata of the target capability. Often the bounds information for a given capability may be defined to correspond with a certain block of function code, and so it is relatively unlikely that once program flow has returned from the processing of the function code, there will be any future memory accesses to addresses in the range defined by the target capability used to police calling of the function (at least until the function is called again). Therefore, following a function call based on a target capability, a cache entry associated with an address in the range associated with the target capability could be marked as prioritised for eviction once the corresponding function return branch has been detected.

Also, when the capability-controlled operation is a manipulation operation to manipulate a manipulated capability to invalidate the manipulated capability or tighten the constraints indicated by the capability metadata of the manipulated capability, the cache control circuitry may prioritise for replacement one or more entries of the at least one cache no longer accessible based on the manipulated capability. If the capability is invalidated or has its capability metadata manipulated to tighten the constraints, then some operations which would previously have been permitted may no longer be permitted to be performed by the software. Hence, any cache entries associated with the addresses or types of permissions now excluded from the narrower constraints of the manipulated capability (or the invalidated metadata of the invalidated capability) may then be evicted as they may be less useful for future operations.

The capability metadata may also specify reuse hint information which may indicate a relative likelihood that a data access or instruction fetch to a particular address will be performed again in future, and/or a frequency with which that data or instruction is likely to be needed (e.g. the reuse hint information may provide a qualitative indication of the interval between successive accesses to the data or instruction). This reuse hint information could be an example of the software-controlled metadata mentioned earlier, since software could annotate particular capabilities to indicate whether a data structure or block of program code to be accessed under control of that capability is likely to be used several times in the program flow or will be used only once. Alternatively, the reuse hint information could be an example of the implementation-specific metadata mentioned earlier, which is maintained by hardware based on monitoring of memory accesses when processing previous instructions, which could track the number of times when a given address is accessed or count the number of cycles, data accesses or instructions executed between successive accesses to the same address. Either way, the reuse hint information may be used to control aspects of caching such as whether, on a given access to a particular address not previously cached, it is useful to allocate any cache entry at all (since data or instructions which are only accessed once and then are never used again may not benefit from allocation of a cache entry, it may be better to preserve cache capacity for other addresses if it can be determined from the capability metadata that reuse is unlikely). Another aspect of cache control that can be controlled based on reuse hint information of the hint capability can be selecting which cache level of a cache hierarchy is to be allocated with data instructions for addresses in a range indicated by bounds information specified by the capability metadata of the hint capability. For example, if the reuse hint information specified by the hint capability indicates a relatively high likelihood/frequency of reuse then a cache level closer to the processing circuitry can be selected, while if the reuse likelihood/frequency is relatively low then a cache level further from the processing circuitry can be selected.

Another example of the micro-architectural control circuitry can be vector load/store control circuitry which issues, in response to a vector load/store instruction, a load/store request to transfer data between memory and a first active vector element of a vector register and issues one or more speculative load/store requests to transfer data between memory and one or more remaining active vector elements of the vector register before it is known how many of the vector elements actually require data to be transferred. Vector load/store instructions may be useful for controlling processing of a certain program loop which requires a set of operations to be performed iteratively for a number of different input values. If scalar instructions are used to perform the loop then each input value may be separately processed by a different iteration of the loop. However, a processor architecture supporting vector instructions can enable multiple iterations of the loop to be performed in response to a single pass through a set of instructions, by allocating the different input values to different vector elements of an operand stored in a vector register and then processing the operand using a set of vector operations which define multiple lanes of processing processed on the respective vector elements, with a single vector instruction being able to control the processing circuitry to perform multiple lanes of processing on independent data values stored in the different vector elements of the operand.

Where the vector instructions are used to accelerate processing of the loop, the total number of iterations required in the loop may not be an exact multiple of the number of vector elements within one vector operands, and the number iterations required may be data-dependent and therefore unknown at the time of writing the program code. For example, the point of the loop at which loop iteration is halted may depend on data-dependent conditions which may be evaluated within the loop (e.g. whether a loaded data value for a given vector element has a certain "stop indicator" value marking the end of the array of data being processed). Hence, to avoid serial evaluation of the loop termination condition for one loop iteration before processing the data from the next iteration, which would serialise processing of the loop and therefore prevent the benefits of vector processing being achieved at all, it is possible to process vector load/store instructions in a speculative manner where the respective lanes of processing corresponding to different vector elements are performed speculatively assuming that the loop termination condition will not arise, but then if it turns out that the loop termination condition did arise in a vector lane corresponding to a particular vector elements then the results of processing subsequent elements in subsequent vector lanes can be discarded.

Hence, some of the vector elements may be processed speculatively. If the processing of a given vector element requires a load/store request to be issued to memory, such load/store requests may be issued speculatively for the vector elements other than the first active vector element of the vector register (the first active vector element can be processed non-speculatively as the loop termination condition for any previously processed iterations may already have been evaluated so that it may already be known that at least the first active vector element does need to be processed). If it turns out that the speculative load/store requests for the vector elements other than the first active vector element were indeed required then issuing these requests speculatively can improve performance. However, sometimes issuing these speculative load/store requests may harm performance because if it turns out that the loop termination condition should have been satisfied for one of the earlier active vector elements of the vector register and so one or more speculative load/store requests were issued unnecessarily for later vector elements, this may unnecessarily consume address translation and memory access resources at a memory management unit or memory system component, which may reduce the bandwidth available for other operations.

The capability metadata of a target capability used as an address operand for the vector load/store instruction can be used to provide hint information to reduce the likelihood that speculative load/store requests are issued unnecessarily and hence improve performance by conserving bandwidth at a memory management unit or other memory system components for other memory access requests which are needed. This is because the bounds information specified by the capability metadata may be defined to coincide with the size of the data structure being processed in the vectorised loop, and so it is reasonably likely that once the addresses of the speculative load/store requests issued when processing the vector load/store instruction stray beyond the end of the range indicated by the bounds information, then this is the point at which it is unlikely that the speculatively issued load/store requests are going to be needed. Hence, the vector load/store control circuitry may suppress issuing of a speculative load/store request for a remaining active vector element corresponding to an address outside permitted bounds indicated by bounds information specified by the capability metadata of the target capability used as an address operand for the vector load/store instruction. This can improve performance by reducing the likelihood that bandwidth at a memory system component or memory management unit is wasted on unneeded speculative memory access requests.

Specific examples will now be described with reference to the drawings. It will be appreciated that the claimed subject-matter is not limited to these particular examples.

FIG. 1 schematically illustrates an example of a data processing apparatus 2. The data processing apparatus has a processor core 3 having a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a vector processing unit 23 for performing vector (single instruction multiple data, or SIMD) operations involving two or more independent vector elements defined within a single operand value or result value; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU) 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and may also specify access permissions which govern whether a given process executing on the pipeline is allowed to read, write or execute instructions from a given memory region. The access permissions specified in the page tables accessed by the MMU 28 may be relatively coarse-grained in that they may specify permissions for a particular memory region which apply to an entire software process as a whole, so that it is not efficient to use the page tables to provide different levels of access permissions for different sub-portions of instructions within a software process.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the processor core 3 also has prefetch circuitry 40 for prefetching data or instructions into the caches 8, 30, 32, cache control circuitry 42 for controlling allocation and replacement of entries in the caches 8, 30, 32, and capability checking circuitry 44 for checking whether constraints defined in a capability operand for a capability-controlled operation are satisfied, to decide whether the capability-controlled operation can be performed or should cause an error handling response to be taken.

As shown in FIG. 1, the apparatus 2 may also have at least one other processor core 37 which may have at least one cache 39. While the other core 37 is not shown in detail, it can have similar features to the processor core 3 shown in more detail in FIG. 1. It is not essential for each core to have the same features—it is possible to provide asymmetric cores which have different micro-architectural resources. For example, not all cores may support use of capabilities as discussed below. An interconnect 36 can be provided to control access to shared memory 34 by the respective processor cores 3, 37. The interconnect 36 may implement a coherency protocol to ensure coherency of information stored in the respective caches 8, 30, 32, 39, so that when a given core 3, 37 accesses a given address, it obtains the latest value including any updates made by other cores 3, 37.

FIG. 2 illustrates an example of some of the registers 14 of the processor core 3. It will be appreciated that FIG. 2 does not show all of the registers which may be provided and there could be additional registers (e.g. vector registers are not shown in FIG. 2 but can be provided for storing vector operands having multiple independent vector elements, for processing by the vector processing unit 23).

The registers may include a set of general purpose integer registers 50 for storing integer operands and results of processing operations performed in response to integer processing instructions, and a set of floating point registers 52 for storing floating point operands or results. Some implementations may not support floating point processing and in this case the floating point registers can be omitted. Also, the registers include a number of control registers 54 which define various control parameters which may control the processing of instructions by the processing pipeline. For example, the control registers 54 may include mode indicating values which specify the current mode of operation of the system, control registers for defining whether certain optional architectural features are implemented or not, and condition status flags which are set in response to outcomes of processing operations and may be tested by conditional instructions to determine whether to perform a conditional operation.

While a variety of information will be stored in the control registers 54, one particular item of control state may be a capability/non-capability mode indication 56 which specifies whether the processing pipeline is currently operating in a capability mode or a non-capability mode. The capability mode is supported by a number of architectural features which allow accesses to memory (either for data accesses in response to load/store instructions or for instruction accesses initiated by the fetch stage 6) to be subject to additional security checks based on constraints specified in association with a value (e.g. an address operand) used to access the memory. The capability may also be referred to as a bounded pointer.

When in the capability mode, the processing pipeline can access a set of capability registers 60 which store capabilities, where a capability comprises a capability value, e.g. an address operand 62 which can be used to form addresses for data or instruction memory accesses, and a set of associated constraint metadata 64 which limits the valid usage of the capability value 62 that is permitted. The capability registers

60 include a set of general purpose capability registers 66 which can generally be referenced by instructions processed by the pipeline in capability mode, either acting as a source register or a destination register for a processing operation. Also, the capability registers 66 include some special purpose capability registers including a program counter capability (PCC) register 68 and a default data capability (DDC) register 70. The PCC register 68 provides in its capability value (address) field a program counter value 72 which in capability mode represents the instruction address of the current point of execution reached by the pipeline. The associated constraint metadata 64 can be used to check whether instruction fetches from the address derived from the program counter are allowed to proceed (or whether updates to the PCC 68 following a branch or other program flow altering operation are permitted). The DDC register 70 defines constraint metadata 64 which can be imposed on memory accesses performed in response to non-capability memory access instructions which do not directly identify that they are to use capabilities, but rather reference the integer registers 50 for forming their address operands. This can be useful for allowing legacy program code written for a system which did not support the capability mode to have the memory accesses triggered by the legacy program code protected by the capability mechanism provided.

For each of the capabilities in the respective capability registers 60, the constraint metadata 64 may specify bounds information 74 and permissions 76. The bounds information 74 defines an allowable range for the capability value (address) 62 indicated in the corresponding capability. The bounds information 74 may specify a base address defining the lower bound of the allowable range for the address 62 and an upper limit address specifying the upper bound for the allowable range for the address 62. In some implementations, the bounds information 74 may be compressed, so that rather than explicitly identifying the base address and upper limit address as a full address with the same number of bits as the address itself, the bounds 74 may be stored in an encoded form which requires fewer bits. For example, each of the upper and lower bounds could be represented in a floating-point-like format using a bounds value indicating the significant bits of the upper or lower bound address and an exponent which indicates a number of bits by which the bounds value should be shifted to give the actual lower/upper limit address (the upper and lower bounds could both share the same exponent value). While this may reduce the precision available for defining the allowable range, by compressing the bounds information this greatly reduces the storage overhead of the capability registers, otherwise storing upper and lower bound addresses in full address form in addition to the address itself could lead to the capability registers being at least three times the size of an integer register storing an address. An example of an encoding scheme which can be used for the bounds information is described in Woodruff et al, "CHERI Concentrate: Practical Compressed Capabilities", IEEE Transactions on Computers 68.10 (2019): 1455-1469. However, it will be appreciated that other encoding schemes could also be used.

The permissions 76 of a given capability define whether one or more types of access right are granted for the use of the corresponding address operand 62. For example the permissions may indicate whether a read permission is granted to provide permission to use the address operand 62 of the capability for controlling a read (load) data access, whether a write permission is granted to provide permission to use the address operand 62 of the capability for controlling a write (store) data access, and whether execute permission is granted providing permission to use the address operand 62 of the capability for determining a branch target address or for controlling fetching of an instruction for execution. In one example, separate permission flags may indicate whether each type of permission is granted or prohibited. Alternatively, a combined encoding of the permissions field 76 may be provided which selects one of a number of permission states with each permission state corresponding to a different combination of whether the read, write and/or execute permissions is granted. Hence it is not essential to provide a separate flag for each type of permission and instead a common state value could indicate which combination of permissions is allowed or not allowed for use of the corresponding address operand 62.

Hence, by defining the constraint metadata 64 associated with a given address 62, an attempt to fetch an instruction from an address defined using the address, or an attempt to carry out a data access based on an address derived from a specified capability register, can be checked against the corresponding constraint metadata 64 to check whether the memory access is allowed. If the bounds 74 are stored in compressed form then such checks may need the stored bounds values to be uncompressed to allow comparison of the address against the bounds 74. Hence, if there is an attempt to perform an instruction fetch based on the PCC 68, but the program counter value is outside the valid bounds 74 specified by the PCC or the permissions 76 indicate that there is no execute permission for use of that program counter value, then a fault may be triggered. Also, if there is a load/store instruction executed which specifies its address using a reference to a particular capability register then if the instruction is a load instruction and there is no read permission indicated by the permissions 76 or the instruction is a store instruction and there is no write permission, then a fault may be generated, and also a fault may be generated if the address operand 62 (or an address calculated relative to the address operand 62) lies outside the valid bounds 74 of the capability.

Unlike the definition of access permissions in the MMU 28, which is typically defined coarsely per process, the use of capabilities enables more fine-grained control over access to memory because the program instruction which specifies a particular capability register thus provides an indication of the intention of that instruction, in the sense that it is intended to access a limited region of memory within certain bounds and certain limits on what use of that region is permitted. A different instruction at a different part of the program code for a given software process may specify a different capability register and thus be subject to a different set of permissions without that portion of program code needing to be separated into a different software process (as may be needed for cases where the different levels of access control is to be controlled solely using an MMU 28). This capability approach makes it much simpler to partition access rights for different sandboxed components within a software process. This can help to improve security as it reduces the attack surface available for attackers to exploit certain memory related usage errors.

As well as checking capability permissions or bounds at the time of accessing memory, it is also possible for certain instructions to check the constraint metadata of the capability at other times. For example some instructions which set the address 62 of a given capability register could trigger a check of whether the address is within the corresponding bounds 74, although this is not essential (as if a check is performed when the capability is subsequently used to control a memory access then this check on setting the address may be redundant).

It will be appreciated that FIG. 2 shows an architectural view of the registers which are available for access by instructions processed by the pipeline 4. However, the physical registers implemented in hardware to provide the data values associated with these architectural registers could differ from the layout shown in FIG. 2. For example in an out-of-order processor the register file 14 may have a greater number of physical registers than the number of architectural registers specified in a given one of the integer register set 50, capability register set 60 or floating point register set 52, and register renaming may be used to map the architectural register specifiers to the physical registers provided in hardware.

Also, while from an architectural point of view the capability registers 60 are shown as separate from the integer registers 50, in some hardware implementations the address field 62 of some of the capability registers 60 may actually share the same hardware storage elements with corresponding integer registers 50. For example, the program counter address field 72 of the PCC register 68 in capability mode may be reused to provide an integer program counter in non-capability mode, where the integer program counter indicates the address of the instruction representing the current point of execution reached in non-capability mode. During non-capability mode the constraint fields 74, 76 of the PCC 68 could be ignored.

Similarly, general purpose capability registers 60 could be superimposed with general purpose registers 50.

Although a common use of capabilities is to impose bounds or permissions to constrain valid use of addresses, capabilities can also be used for other purposes. For example, some capabilities may be "sealed" capabilities which include an object type field (not shown in FIG. 2) which stores a data value representing a token which grants permission to carry out some action. A given software compartment can be granted the permission by making accessible to that software compartment the relevant capability which has the object type field set to the token value. To support such use cases, the various permission bits 76 may include a permission indicator indicating whether or not a capability can act as a sealing capability, which is permitted to seal other capabilities. Capabilities may be provided with a status indication (not shown in FIG. 2) which indicates whether they are unsealed capabilities (for which the parameters of the capability are allowed to be updated) or sealed capabilities (for which parameters of the capability are constrained to retain their current value, and which cannot be directly used (dereferenced)). Sealing of capabilities can protect against the token represented in the object type field being modified. The sealing capability which gives permission to seal other capabilities may specify in its address field 62 the value of the token to be written to the object type field in the target capability being sealed by the sealing operation controlled using the sealing capability, and the bounds 74 of the sealing capability may constrain the range of token values which are allowed for capabilities sealed using that sealing capability. When a sealing operation is performed (which may be triggered by a capability sealing instruction), the capability checking circuitry may check whether the software compartment requesting the sealing operation has referenced a valid sealing capability which has the permission indicator 76 set to indicate permission to seal other capabilities, and if so, whether the value in the address field 62 of the sealing capability is within the bounds specified in the bounds field 74, and if both conditions are satisfied then the value in the address field 62 of the sealing capability may be written to the object type field of the target capability to be sealed, and the target capability may have its sealing status updated to indicate a sealed capability to prevent subsequent modification of the address field 62. Capability load/store instructions may be used to transfer capabilities between the capability register 60 and memory 34 and so the sealed capability acting as a token can then freely be written to a region of an address space which is accessible to a software compartment to which the token is to be passed, thereby granting that software compartment permission to carry out whatever action is represented by the token by referencing that token.

Hence it will be appreciated that although much of the discussion of capabilities with respect to FIG. 2 refers to addresses, it is not essential for the address field 62 to only be used for indicating addresses, as the sealing capability for example may reuse the address field 62 to represent the token value to be applied to a capability being sealed, or other types of capability may control use of other types of capability value.

As well as the architecturally-defined capability metadata such as the bounds information 74 and permissions information 76, a capability may also have some additional metadata 77 which may not have any architecturally-defined meaning. For example, the additional metadata 77 could be software-controlled metadata set by software and/or implementation-specific metadata set by hardware according to a micro-architectural control function.

The processing circuitry may have a mechanism for ensuring that information defined in a capability is unforgeable. For example, there may be architectural rules for capability use to ensure that valid capabilities can only be constructed by instructions that do so explicitly from other capabilities (and not created by error or by byte manipulation, for example), and to ensure that (except in certain circumstances such as sealed capability manipulation and exception raising), when an instruction constructs a new capability it cannot exceed the permissions and bounds of the capability from which it is derived. Further information on such architectural rules can be found in Watson et al, "An Introduction to CHERI", September 2019, UNAM-CL-TR-941, section 2.3.

Capabilities provide more information than is usually (in non-capability-aware architectures) provided in pointers. Some of this additional information can be used as micro-architectural hints for performance optimisations and other micro-architectural control functions, which would not be possible on classical non-capability architectures. For example, the hint information from the capability metadata of a hint capability can be used for controlling function such as prefetching, caching and control of vector operations.

Figure 3:
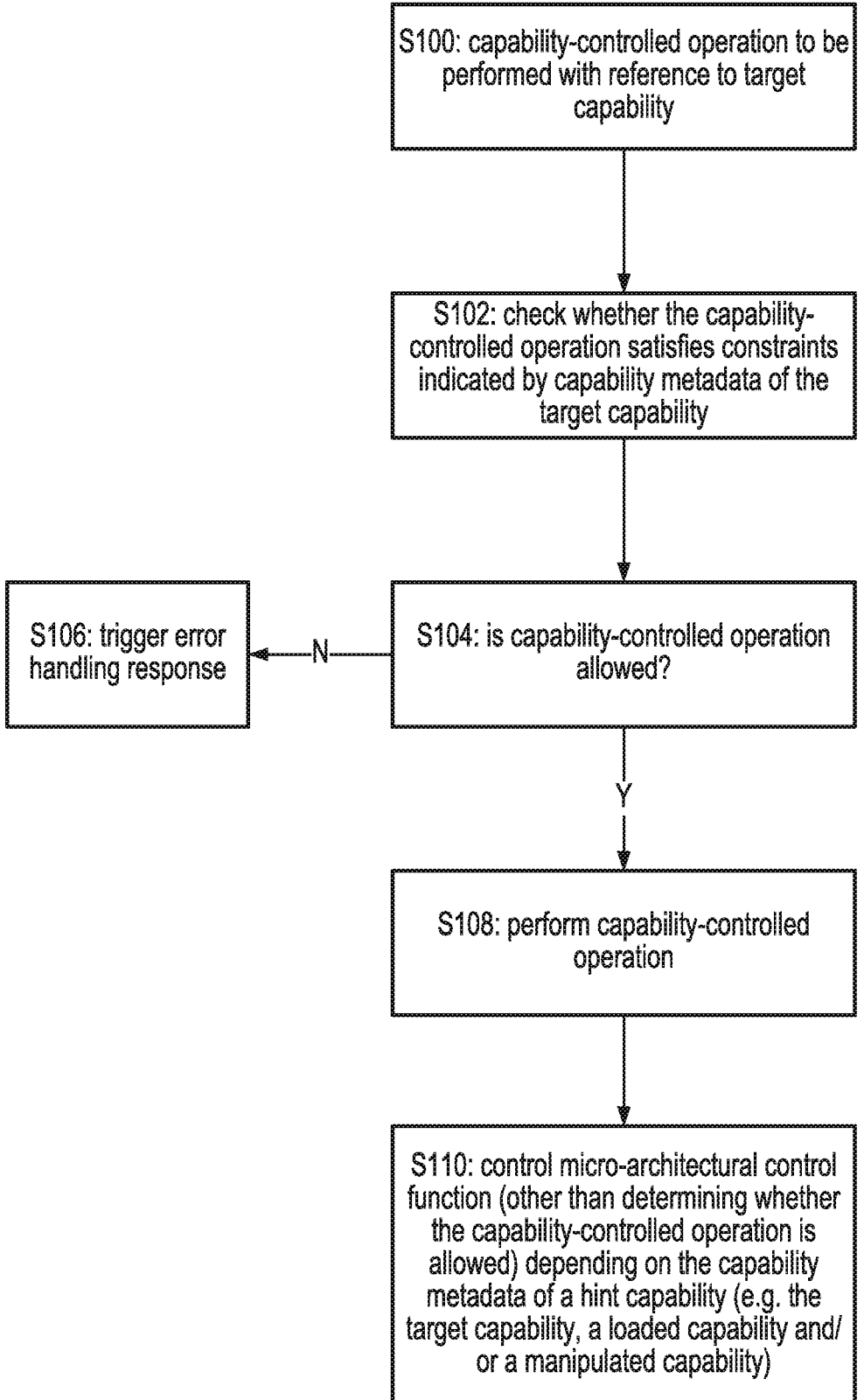
FIG. 3 illustrates a method, including a step of controlling a micro-architectural control function, other than whether a capability-controlled operation is allowed, depending on the capability metadata of a hint capability.

FIG. 3 is a flow diagram illustrating use of capabilities. At step S100 a capability-controlled operation is to be performed with reference to a target capability (for example the instruction requesting the capability-controlled operation may specify one of the capability registers as a source register, or alternatively the target capability may be implicit—e.g. for an instruction fetch the target capability may be the PCC 68 and for a load/store instruction of legacy program code not explicitly referencing capabilities the target capability may be the DDC 70).

At step S102 the capability checking circuitry 44 checks whether the capability-controlled operation satisfies constraints indicated by the capability metadata of the target capability. For example, the capability checking circuitry 44 determines whether the type of operation requested to be performed is indicated as permitted by the permissions information 76 of the target capability, and checks whether the capability value 62 of the target capability (or a value derived from the capability value 62 of the target capability) is within the range indicated by the bounds information 74. For example if the capability-controlled operation is a memory access operation then it is checked whether an address derived from the address field 62 of the capability is within the range indicated by bounds 74, and checked whether the memory access type (read, write or instruction fetch) is indicated as permitted by the permissions information 76. At step S104 the capability checking circuitry 44 determines whether the capability-controlled operation is allowed, and if not then at step S106 the capability checking circuitry 44 triggers an error handling response. For example the error handling response could be one or more of: rejecting the capability-controlled operation, signalling a fault, and/or recording that the error occurred in an error log. On the other hand, if the capability-controlled operation is allowed then at step S108 the processing circuitry 16 performs the capability-controlled operation.

At step S110, a micro-architectural control function is controlled depending on the capability metadata of a hint capability. For example, the micro-architectural control function could be prefetching performed by the prefetch circuitry 40, control of caching performed by the cache control circuitry 42, or control of load/store requests issued for vector operations performed by the vector processing unit 23 or load/store unit 26. The hint capability could be the target capability referenced in the capability-controlled operation. Alternatively the hint capability could be a loaded capability loaded from memory 34 to a cache 30, 32 or loaded from memory 34 or a cache 30, 32 to a capability register 60. Hence, when performing a load it is possible to examine the loaded data value to check whether it is encoded as a valid capability and if so use the capability metadata of the loaded capability as the hint for controlling the micro-architectural control function. Also, if an operation is performed to manipulate a given capability in a capability register 60 (for example by invalidating the given capability or adjusting the capability metadata to reduce the scope of operations permitted based on the metadata, e.g. by narrowing the bounds 74 or reducing the number of permitted types of operations), then the capability metadata of the manipulated capability can be used as the hint information for controlling the micro-architectural control function.

Figure 4:
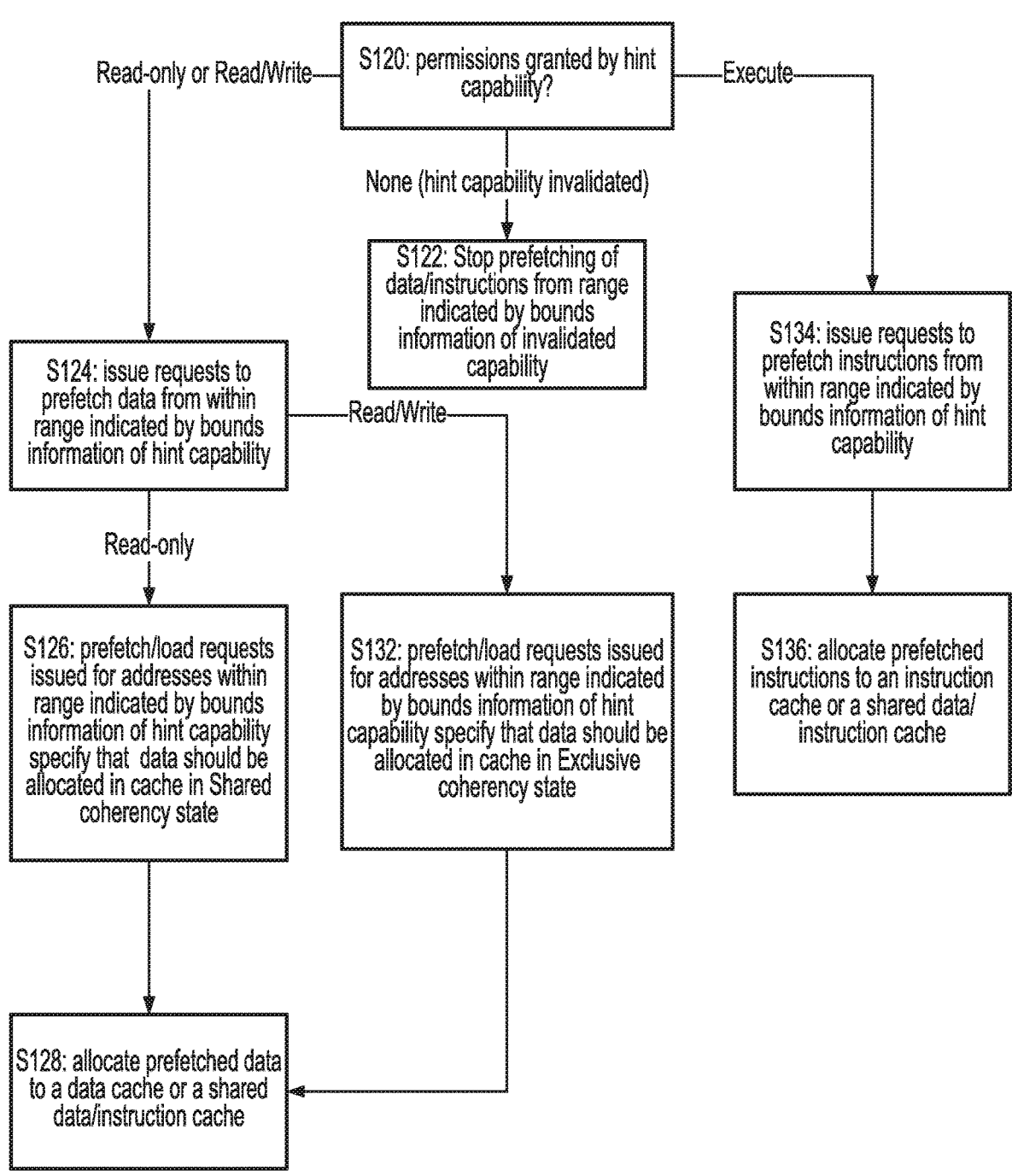
FIG. 4 shows an example of controlling prefetching based on a hint capability.

FIG. 4 illustrates a first example of controlling a micro-architectural control function based on capability metadata from a hint capability. In this example the micro-architectural control function is prefetching performed by the prefetch circuitry 44. At step S120 the prefetch circuitry 44 obtains a hint capability, which could be the target capability, loaded capability or manipulated capability as discussed above. The prefetch circuitry 44 checks which permissions are indicated as granted (permitted) by the permissions information 76 of the hint capability. If the hint capability indicates that no actions are permitted (for example because the hint capability is an invalidated capability that has just been invalidated by the processing circuitry 16) then at step S122 the prefetch circuitry halts any prefetching of data or instructions from the range indicated by the bounds information 74 of the hint capability that was invalidated. For example, any prefetch training entry allocated for addresses in the range of the invalidated capability, which is updated in response to addresses accessed in memory accesses and used to form predictions of addresses to prefetch in future, can be invalidated.

If at step S120 the prefetch circuitry determines that the hint capability indicates that either read-only (read, but no write permission) or read/write access is granted using the hint capability, then at step S124 the prefetch circuitry controls issuing of requests to prefetch data from within an address range indicated by the bounds information 74 of the hint capability. Hence, the bounds information 74 is used to guide the prediction of addresses for which future accesses are likely. The address indicated as the capability value 62 of the hint capability can also be used to determine the addresses for which prefetch requests should be issued. For example, the issued prefetch requests may specify addresses in the range between the address indicated as the capability value 62 and the upper address bound indicated by the bounds information 74, as it may be less likely that future data accesses will target the lower part of the allowable range lying between the lower address bound and the capability value 62.

At step S126, if the permissions information specified a Read-only access permission (without write permission), any issued prefetch requests issued for addresses within the range indicated by the bounds information of the hint capability are controlled to specify that the corresponding data should be allocated in a cache 30, 32 in a Shared coherency state. Also, some control information can be stored to specify that future load requests to addresses in that range should also request loading of data into the cache 30, 32 in a Shared coherency state. When data is cached in the Shared coherency state, this indicates that while the data can be read without checking with other caches 39 of other cores 37 subject to a coherency protocol, writes to the data in the cache would require the data to be promoted to an Exclusive coherency state before proceeding, in case any other caches 39 hold data which becomes out of date on the write. Hence, a write to data in the Shared coherency state may trigger snoops of the other caches 37 to check for data for a corresponding address which should be invalidated to allow the data to be Exclusive in the cache of the processor requesting the write. Hence, bringing data into the cache in an Exclusive state may be slower and cause greater effects on performance of the system as a whole as invalidating data at other caches could harm performance at the processor cores 37 associated with those other caches 37. In the case of step S126, as the permissions information 76 of the hint capability specifies the Read-only permission, then it is unlikely that any write request will be issued for the address is in the range indicated by the bounds information 74, and so performance can be improved by requesting the data only in the Shared coherency state, rather than in an Exclusive coherency state, so that additional checks and invalidations of corresponding data in other caches 39 can be avoided for the addresses subject to read-only access.

On the other hand, if the permissions information 76 of the hint capability indicated that both reads and writes to the addresses within the range indicated by the bounds information are permitted then at step S132 any prefetch requests issued by the prefetch circuitry 40 for addresses within the range indicated by the bounds information 74 may specify that the data should be allocated into a cache 30, 32 in an Exclusive coherency state. This means the more costly operations to make the data Exclusive can be incurred at the time of the prefetch request to avoid needing to perform further checks later when a subsequent write operation to the corresponding address is requested by the load/store unit 26, improving performance by reducing the delays associated with processing the subsequent write operation. Again, control information could also be stored to indicate that future load requests to addresses in the associated range defined by the bounds information 74 of the hint capability will also request the data to be brought into the cache in the Exclusive coherency state.

Regardless of whether the permissions indicated read-only permission or read/write permission, at step S128 the prefetched data is allocated to a data cache 30 or to a shared cache 32 shared for both data and instructions. Hence, based on the permissions information the prefetch circuitry 40 has determined that data prefetching should be performed rather than instruction prefetching.

On the other hand, if at step S120 the prefetch circuitry determines from the permissions information 76 of the hint capability that execute permission is granted for instruction fetches based on the address provided as the capability value 62 of the hint capability, then at step S134 the prefetch circuitry can issue requests to prefetch instructions from within the address range indicated by the bounds information 74 of the hint capability, and at step S136 the prefetch instructions are allocated into an instruction cache 8 or a shared cache 32 shared for both data and instructions. Hence, based on the permission information 76 the prefetch circuitry 40 has determined that instruction prefetching should be performed rather than data prefetching, due to the presence of the execute permission in the capability metadata of the hint capability. At step S134, similar to step S124, some implementations may also consider the address indicated as the capability value 62 for the hint capability, when determining which addresses should be specified by the prefetch requests, to prioritise prefetch requests for addresses in the upper part of the allowable range lying between the address indicated as the capability value 62 and the upper bound of the bounds information 74.

Hence, based on hint information derived from a capability, the prefetch circuitry 40 can control aspects of prefetching such as control over which addresses are prefetched, the coherency state in which cache entries for prefetch data are requested, and determining whether instructional data prefetching should be performed.

It will be appreciated that the control over whether data loaded into a cache should be allocated in a Shared or Exclusive coherency state can also be performed for the processing of load requests other than prefetch request, which are issued on demand in response to the instructions processed by the processing pipeline, so in some cases the control over the coherency state in which a cache entry is allocated could be controlled by the cache control circuitry 42 or the load/store unit 26 rather than the prefetch circuitry 40.

FIGS. 5 to 7 illustrate various other examples of controlling the operation of the caches using the cache control circuitry 42, based on hint information derived from the capability metadata of a hint capability.

FIGS. 5 and 6 show examples of controlling cache replacement policy based on the hint information. At step S160 of FIG. 5, the cache control circuitry 42 identifies that a function return branch has been performed by the processing circuitry 16 after previously performing a function calling branch to an address derived from the capability value 62 of a target capability. For example, this event may be detected based on a signal provided from the branch unit 24 or the capability checking circuitry 44 indicating that the function return branch has been detected after previously performing a capability-controlled operation to branch to the address derived from the capability value 62. When such a function return branch is detected then at step S162 the cache control circuitry 42 identifies one or more cache entries of at least one cache 8, 30, 32 which are associated with an address within the range indicated by the bounds information 74 of the target capability. If the target capability specifies permissions information 76 indicating an execute permission then the instruction cache 8 could be searched for such entries, while if the permissions information 76 of the target capability does not provide execute permission, but only provides read or write permission, then the data cache 30 could be searched for such entries. If any cache entries are found associated with addresses within the range indicated by the bounds information 76 of the target capability, then those entries can either be evicted or invalidated immediately, or alternatively those entries can be retained for now but marked with a flag or other indicator to indicate that if a new cache entry needs to be allocated to the cache and an existing entry needs to be replaced, the victim selection algorithm could prioritise evicting an entry marked with that flag or indicator (indicating that it related to an address within the bounds of a target capability for which the corresponding function has already finished processing). This does not necessarily mean that the entry marked with the flag or indicator will definitely be the one selected for replacement, as the replacement policy decisions could be a multi-factor problem which may consider a number of competing considerations. Nevertheless, by considering the hint provided by the target capability when making replacement policy decisions, this can increase the likelihood that the entry selected for eviction is one which is less likely to be used again in future, since it may be assumed that after returning from the function which was called using the target capability, the addresses within the range of the target capability are less likely to be accessed again.

Similarly, FIG. 6 illustrates an example of marking cache lines as preferred for eviction following an invalidation or manipulation of a given capability. At step S170 the cache control circuitry 42 detects that the processing circuitry 16 has performed the manipulation operation to manipulate a particular capability, referred to as the manipulated capability. This manipulation could be an invalidation of the manipulated capability so that the manipulated capability can no longer be used to validate capability-controlled operations, or could be an update to the metadata associated with the manipulated capability so that the manipulated capability may remain valid but the constraints indicated by the metadata are tightened, for example by reducing the size of the range indicated by the bounds information 74 or updating the permissions information 76 to indicate that an action previously permitted is no longer permitted. In response to detecting the manipulation operation performed on the manipulated capability, at step S172 the cache control circuitry 42 marks cache lines which are no longer accessible based on the manipulated capability as preferred for eviction when a cache entries to be replaced. Again, the cache control circuitry 42 could determine, based on the presence/absence of the execute permission in the manipulated capability, whether to search for such entries in the instruction cache 8 or the data cache 30. If an entry is found associated with an address which can no longer be accessed using the manipulated capability, then that entry can be marked as preferred for eviction using a similar technique to the one discussed above for step S162 of FIG. 5.

FIGS. 5 and 6 show examples of replacement policy decisions prioritising for eviction entries determined from capability metadata as no longer being required. However, conversely, following processing of a capability-controlled operation referencing a target capability or a load of a loaded capability, the target capability or loaded capability may be used as a hint capability and the capability metadata of the hint capability could be used to determine that certain addresses or access types are likely in future and therefore that corresponding entries of the cache should be prioritised for retention if a victim entry needs to be selected, making it more likely that other entries not within the bounds specified by the hint capability are evicted instead.

Another feature of cache control that could be controlled based on hint information from a capability may be decisions on whether to allocate cache entry at all following a memory access or instruction fetch to a particular address, and/or a decision when a cache entry is allocated regarding which level of the cache hierarchy should be used to cache the data or instructions. For example, the additional metadata 77 described earlier may be used to provide reuse hint information which provides hints as to the likelihood of data or instruction being reused again after a first data access or instruction fetch and/or information about the estimated interval predicted to arise between two successive uses of the same data or instruction. This additional metadata 77 could be controlled by software, or could be maintained automatically by hardware of the processing apparatus 2 based on monitoring of behaviour of the program code on a previous instance of execution. At step S180 of FIG. 7, the cache control circuitry 42 determines, based on the reuse hint information specified in the capability metadata other hint capability, whether to cache data or instructions from addresses in the associated range of addresses indicated by the bounds information 74 of the hint capability. At step S182, if it has been determined that data or instructions from addresses in the associated range should be cached, then the cache control circuitry also determines which cache level should be allocated with the cache data or instructions, depending on the reuse hint information.

For example, the reuse hint information could indicate whether the addresses in the indicated range are expected to be used in a streaming access pattern where each address is expected to be used only once (or a relatively few times) before the corresponding data/instruction can be discarded from the cache, or a temporal access pattern where multiple accesses to the same address are expected in a given time frame. If the reuse hint information of the hint capability indicates the temporal access pattern then it may be more likely that caching is beneficial and so at step S180 the cache control circuitry may determine to allocate a cache entry for the accessed data/instructions, whereas for capabilities which indicate the reuse hint information specifying the streaming access pattern caching could be suppressed for the corresponding range of addresses. Similarly, if the reuse hint information of the hint capability indicates that the interval between successive accesses is likely to be short then data or instructions could be allocated to a level of the cache hierarchy closer to the processing pipeline (such as the level 1 caches 8, 30 shown in FIG. 1), while if the hint capability indicates reuse hint information specifying a longer interval between successive accesses then the data or instructions could be allocated to a level of the cache hierarchy closer to memory, such as the level 2 cache or a further cache. A benefit of indicating the reuse hint information in the additional metadata 77 of a hint capability (rather than maintaining such reuse hint information in other, non-capability-based, storage), is that this means that if the hint capability is written back to a cache or memory that additional metadata 77 may (in some implementations at least) be retained so as to still be available at the point when that hint capability is read back into registers from memory. Alternatively, other implementations may prefer to discard implementation-specific additional metadata 77 maintained by hardware when writing back to memory 34 from a cache 30, 32 (software defined additional metadata could still be retained when writing back to memory), as it may be considered that such hardware-maintained hints may become out of date if the capability has been used insufficiently frequently to justify keeping it in the cache 30, 32.

Figures 8, 9:
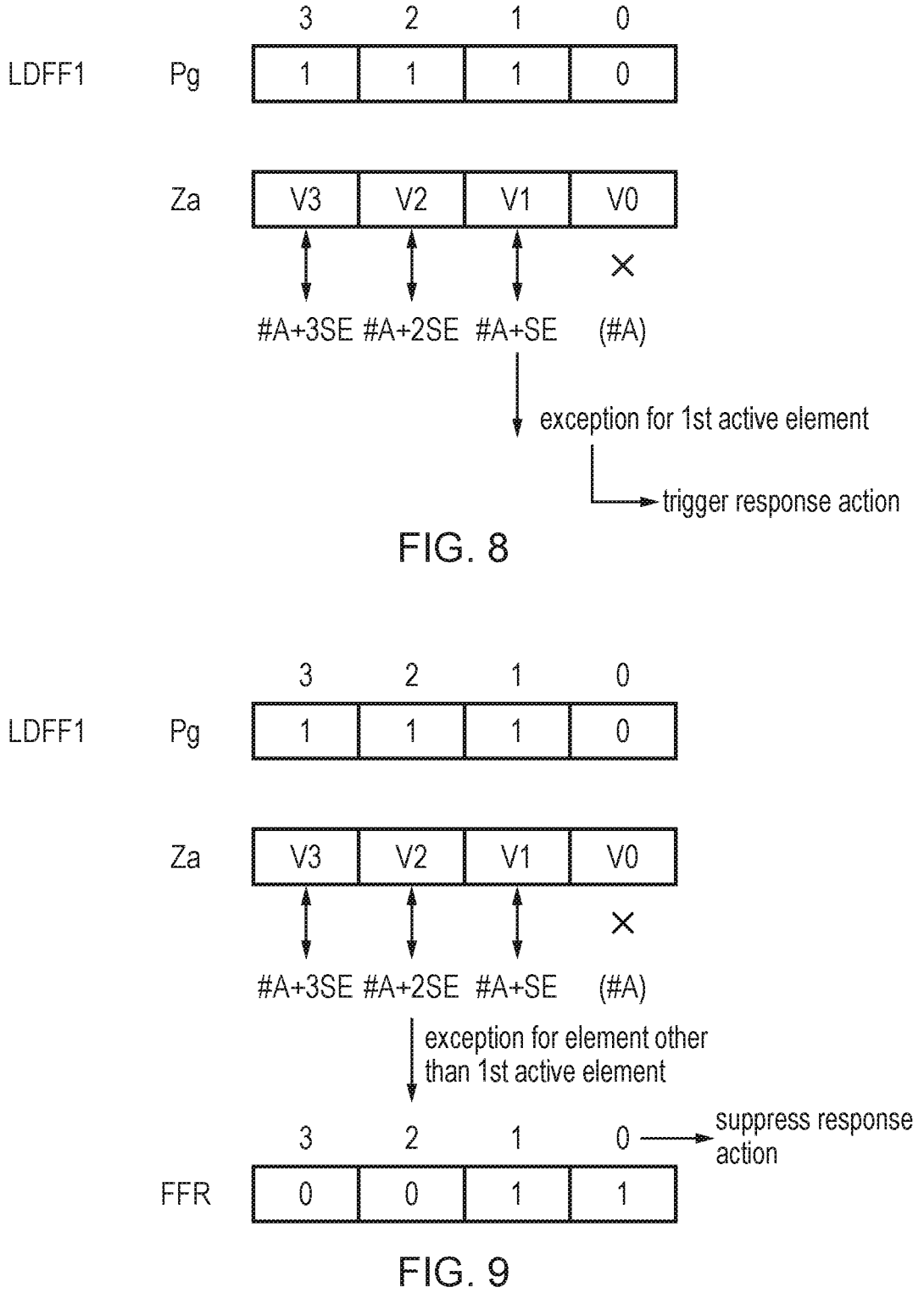
FIGS. 8 and 9 illustrate an example of a first-faulting vector load instruction.

FIGS. 8 and 9 illustrates an example of a vector load/store instruction (in this example, a load instruction for loading data from memory to a register, although a similar example may be provided for a store instruction which stores data from a register to memory) which may be supported by the vector processing unit 23 and/or the load/store unit 26. The instruction specifies an address operand used to calculate a target address #A, a destination vector register Za to which data is to be loaded from the memory system and a predicate register Pg for specifying a predicate value used to indicate which vector elements of the destination vector register are active elements. For example, in FIGS. 8 and 9 the vector register comprises four vector elements numbered 0-3 and in this particular example of executing instruction the predicate value specifies that element 0 is inactive and elements 1-3 are active. Element 0 corresponds to the calculated target address #A and the remaining elements correspond to addresses which are at multiples of a certain offset SE relative to the calculated target address #A. For the active elements of the destination vector register Za, the processing circuitry loads data from the corresponding address and writes the loaded data in the corresponding portion of the destination vector register. For the inactive elements the effect of the corresponding load is suppressed, and either the corresponding inactive element of the destination vector register could be set to a predetermined value such as 0, or the inactive element of the destination vector register could retain its previous value prior to executing the instruction.

The loads performed for the respective vector elements of the destination vector register could potentially trigger an address fault if either the MMU 28 cannot locate a corresponding page table entry for the corresponding address (as the address maps to an unmapped region of memory for which no page table entry has been defined) or the corresponding page table entry specifies that the address cannot be accessed due to violating access permissions. Such a page fault may occur if the sequence of addresses at intervals of the specified offset SE spans a page boundary. The instruction shown in FIG. 8 and FIG. 9 is a first-faulting form of the vector load instruction, which means that, as shown in FIG. 8, if an address fault or other exception arises due to the memory access request issued for the first active element of the vector (in this example, element 1) then a corresponding exception handling response action is triggered (for example, taking an exception to cause an exception handling routine to examine the cause of the address fault and fix up the page tables if necessary). However, as shown in FIG. 9, if the load associated with the first active element of the vector does not cause an exception condition, but an exception condition arises for one of the remaining active elements, then the response action is suppressed (e.g. no exception is signalled), and instead a register, labelled FFR (first faulting register) in this example, is updated to indicate which elements of the vector caused the exception (in this example elements 2 and 3). The FFR can be used by software to determine how to proceed when executing subsequent instructions.

This form of the instruction can be useful for allowing a loop written in a high level programming language to be vectorised when compiling the high level program code into the program code executed according to the instruction set architecture supported by the processing apparatus 2. The loop may be intended to process each element of a certain array of data stored in memory, and each iteration of the loop in the high level programming language may read a variable from the corresponding element of the array, perform a set of processing operations on the variable, store results of processing to memory, determine whether a loop termination condition is satisfied based on the result of performing that set of processing operations, halt the loop if the loop termination condition is satisfied, and otherwise continue with the loop to perform another iteration performed on a different element of the array. If this was compiled into scalar program code then each iteration of the loop may comprise, for example, one or more scalar load instructions to load operands for that iteration, a set of scalar arithmetic/logical instructions for performing the processing operations on the loaded value, one or more store instructions to store results of the processing operations, a scalar compare instruction to evaluate the loop termination condition, and a conditional branch instruction to branch back to the start of the loop if the loop termination condition is not yet satisfied, as well as various instructions for maintaining loop progress tracking variables such as an iteration counter used to derive the address of the data value to be read from memory on a given iteration of the loop.

In a processing architecture which supports vector instructions, processing of the loop may be accelerated by mapping each scalar iteration onto a different lane of a set of vector operations, which process vector operands comprising multiple independent vector elements within a single operand. Hence, the scalar load, arithmetic/logical, compare and store instructions could be replaced with vector equivalents. For the load instruction as shown in FIG. 8 or FIG. 9, the addresses corresponding to each vector element may be the addresses relating to the data to be loaded in a number of successive iterations of the original high level program loop. For the majority of the iterations of the loop, this approach may work well as each pass through a set of vector code can process a number of scalar loop iterations corresponding to the number of vector elements supported within one vector, allowing greater throughput of processing workload per executed instruction. However, where the loop termination condition depends on the data generated in a given iteration of the loop then it is possible that the iteration at which the loop terminates may not be an exact multiple of the number of vector elements in one vector operands, so that it is possible that the loop should have halted partway through the last iteration of the vectorised code and so several additional vector elements have been processed in that last iteration which should not of been processed. Sometimes, this may not be a problem since the additional results calculated through such unnecessary vector lanes of processing can simply be discarded.

However, if any of the load requests issued for unnecessarily processed vector elements causes an address fault or other exception condition then this may adversely affect performance because the exception taken to deal with the address fault or other exception will interrupt the regular processing of the program being executed while the exception handler executes, causing a delay in subsequent operations. This problem can be avoided by providing a first-faulting form of a vector load instruction for which the first active element of the vector is processed non-speculatively so that the load request issued for that element will cause an exception to be signalled if a fault or other exceptional condition arises. However, the remaining active elements of the vector are processed speculatively so that, while load requests are issued for those remaining elements to allow the data to be available sooner in the event that there is no fault, if any fault does arise for those load requests issued to the remaining speculatively processed elements, the fault is not treated as requiring an exception to be taken (the response action that would normally be taken for such faults is suppressed) and instead a register is updated to indicate which elements encountered the fault. A subsequent instruction in software can examine the first faulting register to check what occurred and then if the software determines that some of the elements for which a fault arose were correctly processed elements then it can cause an exception handler to be called or can cause the instruction to be executed again with the target address updated so that the first active element will now be one of the elements which previously faulted, allowing further forward progress to be made. On the other hand, if the only reason why the faults arose was that the loop had reached its termination condition and so the elements encountering the fault should not been processed anyway then the software can determine that there is no need to trigger the response action for the address fault as the faults were only an artefact of vectorisation caused by the fact that the total number of elements required to be processed in the loop was not an exact multiple of the vector length. While FIGS. 8 and 9 show an example for a vector load instruction, similar example can be shown for a vector store instruction (in that case the store requests for each element are causing data from a source vector register of the store instruction to be written to memory, rather than writing data from memory to a destination vector register as in FIGS. 8 and 9, but otherwise the first-faulting behaviour can be similar to the load example explained above).

While the first-faulting behaviour can be useful to avoid the very high performance cost of encountering an address fault on vector elements which may turn out not to have been required to be processed, in typical implementations which support the first faulting vector load/store instruction, such speculatively processed vector elements still require load requests to be issued to the MMU 28 and to the memory system 30, 32, 34, and so even when these requests do not cause an exception condition, these requests do consume bandwidth at the MMU 28 and the memory system, which incurs some performance cost even if it turns out those requests are not required. If the requests were not required, the bandwidth consumed by issuing the speculative load/store request could have been used instead to service other memory access requests, but in a standard non-capability architecture there may be no information available to estimate whether any of the operations performed for speculatively processed elements will really be needed.

However, in a capability architecture, the target address #A may be derived from the address field 62 of a given capability, and if so then the bounds information 74 provides hint information which can be used to determine whether it is likely that the load/store request corresponding to a particular vector elements of the vector register is likely to be needed. For a memory access performed for such a vectorised program loop using a particular target capability to define the address operand, it is likely that the address range specified by the bounds information 74 of the corresponding capability will be set to match the dimensions of the array of data being processed in the vectorised loop, and so it is reasonably likely that at the point where the loop is to terminate because it has reached the end of the array of data being processed, further addresses beyond the address of the final element of the array may extend beyond the upper bound specified by the bounds information 74. Therefore, the vector processing unit 23 or the load/store circuitry 26 can use the bounds information 74 of the target capability used as the address operand for the first-faulting load/store instruction as hint information to suppress issuing of speculative load/store requests for addresses which extend outside the range indicated by the bounds information 74. This reduces the likelihood that speculative load/store requests are issued unnecessarily and hence conserves MMU bandwidth and memory system bandwidth for other requests which can then benefit from higher performance because they have less contention for address translation and memory access resource.

FIG. 10 is a flow diagram illustrating control of processing a vector load/store instruction using hints from capability metadata. At step S200, the processing circuitry 16 (e.g. using the vector processing unit 23 or the load/store unit 26) identifies that a vector load/store instruction is to be processed as a capability-controlled operation, for which a target capability is used as an address operand, a load/store request is to be issued non-speculatively for the first active vector element of the destination vector (for a load instruction) or a source vector (for a store instruction), and speculative load/store requests are to be issued for remaining active elements. In response to this instruction, the vector unit 23 or the load/store unit 26 may act as micro-architectural control circuitry which uses the bounds information of the target capability as hint information for controlling a micro-architectural control function (namely control of speculation for the load/store requests). The micro-architectural control circuitry suppresses issuing of a speculatively issued load/store request for a remaining vector element which corresponds to an address outside the permitted bounds indicated by the bounds information 74 of the target capability.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

processing circuitry configured to perform data processing in response to instructions;

capability storage circuitry configured to store at least one capability, each capability specifying a capability value and capability metadata indicative of constraints on valid use of the capability value;

capability checking circuitry configured to determine whether a capability-controlled operation to be performed by the processing circuitry with reference to a target capability is allowed, based on whether the capability-controlled operation satisfies the constraints indicated by the capability metadata of the target capability, and to trigger an error handling response when the capability-controlled operation fails to satisfy the constraints indicated by the capability metadata of the target capability; and micro-architectural control circuitry configured to control a micro-architectural control function, other than determining whether the capability-controlled operation is allowed, depending on the capability metadata specified by a hint capability used to provide a hint to the micro-architectural control function, in which:

the micro-architectural control circuitry comprises prefetch circuitry configured to control, depending on the capability metadata specified by the hint capability, prefetching of data or instructions to at least one cache;

the capability metadata of a given capability specifies permissions information specifying permitted types of capability-controlled operations permitted to be performed with reference to the given capability; and the prefetch circuitry is configured to select, depending on the permissions information of the hint capability, whether to perform data prefetching or instruction prefetching.

2. The apparatus according to claim 1, in which the hint capability is at least one of:

the target capability referenced in the capability-controlled operation;

a loaded capability loaded to the capability storage circuitry; and a manipulated capability manipulated by an operation performed by the processing circuitry.

3. The apparatus according to claim 1, in which the capability metadata of a given capability specifies at least one of:

bounds information specifying permitted bounds for the capability value or a value derived from the capability value, and permissions information specifying permitted types of capability-controlled operations permitted to be performed with reference to the given capability; and the micro-architectural control circuitry is configured to control the micro-architectural control function based on at least one of the bounds information and the permissions information of the hint capability.

4. The apparatus according to claim 1, in which the capability metadata comprises implementation-specific metadata other than architecturally-defined metadata having a meaning defined by an instruction set architecture supported by the processing circuitry, or software-specific metadata other than the architecturally-defined metadata; and the micro-architectural control circuitry is configured to control the micro-architectural control function based on the implementation-specific metadata or the software-controlled metadata of the hint capability.

5. The apparatus according to claim 1, in which the micro-architectural control circuitry is configured to control the micro-architectural control function depending on both the capability metadata and the capability value specified by the hint capability.

6. The apparatus according to claim 1, in which the micro-architectural control function comprises a speculation control function for controlling performance of at least one speculative operation.

7. The apparatus according to claim 1, in which the capability metadata specifies bounds information specifying permitted bounds for the capability value or a value derived from the capability value; and the prefetch circuitry is configured to identify, based on the bounds information of the hint capability, a range of addresses from which to prefetch data or instructions.

8. The apparatus according to claim 1, in which:

in response to determining that the permissions information of the hint capability specifies an execute permission indicating that the hint capability grants permission to execute instructions from an associated address range indicated by bounds information of the hint capability, the prefetch circuitry is configured to perform instruction prefetching; and in response to determining that the permissions information of the hint capability specifies a read or write permission indicating that the hint capability grants permission to read or write data at the associated address range, the prefetch circuitry is configured to perform data prefetching.

9. The apparatus according to claim 1, in which the micro-architectural control circuitry comprises cache control circuitry configured to control allocation or replacement of entries in the at least one cache.

10. The apparatus according to claim 9, in which the capability metadata of a given capability specifies bounds information specifying permitted bounds for the capability value or a value derived from the capability value and permissions information specifying permitted types of capability-controlled operations permitted to be performed with reference to the given capability; and the cache control circuitry is configured to select, based on the permissions information of the hint capability, a coherency state to be used for allocation of a given cache entry associated with an address in an associated address range indicated by the bounds information of the hint capability.

11. The apparatus according to claim 10, in which:

the processing circuitry is one of a plurality of processor cores, and the cache control circuitry is configured to control allocation or replacement of entries in at least one cache of said one of the plurality of processor cores;

in response to determining that the permission information of the hint capability specifies a write permission indicating that the hint capability grants permission to write to addresses in the associated address range, the cache control circuitry is configured to allocate the given cache entry in an exclusive or modified coherency state indicating that subsequent writes to the given cache entry are allowed to be performed without checking whether at least one other cache of another of the plurality of processor cores holds data for a corresponding address; and in response to determining that the permission information of the hint capability specifies that permission is granted to read from addresses in the associated address range but permission is denied for writing to addresses in the associated address range, the cache control circuitry is configured to allocate the given cache entry in a shared coherency state indicating that subsequent reads to the given cache entry are allowed to be performed without checking whether at least one other cache of another of the plurality of processor cores holds data for a corresponding address, but subsequent writes to the given cache entry would require a check of whether at least one other cache of another of the plurality of processor cores holds data for the corresponding address.

12. The apparatus according to claim 9, in which the cache control circuitry is configured to control, depending on the capability metadata specified by the hint capability, selection of a victim entry to be replaced in the at least one cache.

13. The apparatus according to claim 12, in which, when the capability-controlled operation is a function-calling branch operation to branch to function code at an address derived from the capability value of the target capability, in response to a subsequent function return branch to return from processing of the function code, the cache control circuitry is configured to prioritize for replacement one or more entries of the at least one cache associated with one or more addresses in a range indicated by bounds information specified by the capability metadata of the target capability.

14. The apparatus according to claim 12, in which, when the capability-controlled operation is a manipulation operation to manipulate a manipulated capability to invalidate the manipulated capability or tighten the constraints indicated by the capability metadata of the manipulated capability, the cache control circuitry is configured to prioritize for replacement one or more entries of the at least one cache no longer accessible based on the manipulated capability.

15. The apparatus according to claim 9, in which the cache control circuitry is configured to select, depending on reuse hint information specified by the capability metadata of the hint capability, at least one of:

whether a cache entry should be allocated at all for data or instructions associated with addresses in a range indicated by bounds information specified by the capability metadata of the hint capability; and which of a plurality of cache levels of a cache hierarchy is a target cache level to be allocated with data or instructions for addresses in a range indicated by bounds information specified by the capability metadata of the hint capability.

16. The apparatus according to claim 1, in which the micro-architectural control circuitry comprises vector load/store control circuitry configured to issue, in response to a vector load/store instruction, a load/store request to transfer data between memory and a first active vector element of a vector register and to issue one or more speculative load/store requests to transfer data between memory and one or more remaining active vector elements of the vector register before it is known how many of the vector elements actually require data to be transferred; and the vector load/store control circuitry is configured to suppress issuing of a speculative load/store request for a remaining active vector element corresponding to an address outside permitted bounds indicated by bounds information specified by the capability metadata of the target capability used as an address operand for the vector load/store instruction.

17. A non-transitory computer-readable medium to store computer-readable code for fabrication of the apparatus of claim 1.

18. An apparatus comprising:

processing circuitry configured to perform data processing in response to instructions;

capability storage circuitry configured to store at least one capability, each capability specifying a capability value and capability metadata indicative of constraints on valid use of the capability value;

capability checking circuitry configured to determine whether a capability-controlled operation to be performed by the processing circuitry with reference to a target capability is allowed, based on whether the capability-controlled operation satisfies the constraints indicated by the capability metadata of the target capability, and to trigger an error handling response when the capability-controlled operation fails to satisfy the constraints indicated by the capability metadata of the target capability; and micro-architectural control circuitry configured to control a micro-architectural control function, other than determining whether the capability-controlled operation is allowed, depending on the capability metadata specified by a hint capability used to provide a hint to the micro-architectural control function, in which the micro-architectural control circuitry comprises vector load/store control circuitry configured to issue, in response to a vector load/store instruction, a load/store request to transfer data between memory and a first active vector element of a vector register and to issue one or more speculative load/store requests to transfer data between memory and one or more remaining active vector elements of the vector register before it is known how many of the vector elements actually require data to be transferred, and the vector load/store control circuitry is configured to suppress issuing of a speculative load/store request for a remaining active vector element corresponding to an address outside permitted bounds indicated by bounds information specified by the capability metadata of the target capability used as an address operand for the vector load/store instruction.

19. An apparatus comprising:

processing circuitry configured to perform data processing in response to instructions;

capability storage circuitry configured to store at least one capability, each capability specifying a capability value and capability metadata indicative of constraints on valid use of the capability value;

capability checking circuitry configured to determine whether a capability-controlled operation to be performed by the processing circuitry with reference to a target capability is allowed, based on whether the capability-controlled operation satisfies the constraints indicated by the capability metadata of the target capability, and to trigger an error handling response when the capability-controlled operation fails to satisfy the constraints indicated by the capability metadata of the target capability; and micro-architectural control circuitry configured to control a micro-architectural control function, other than determining whether the capability-controlled operation is allowed, depending on the capability metadata specified by a hint capability used to provide a hint to the micro-architectural control function, in which the micro-architectural control circuitry comprises cache control circuitry configured to control allocation or replacement of entries in at least one cache, and in which at least one of:

the capability metadata of a given capability specifies bounds information specifying permitted bounds for the capability value or a value derived from the capability value and permissions information specifying permitted types of capability-controlled operations permitted to be performed with reference to the given capability, and the cache control circuitry is configured to select, based on the permissions information of the hint capability, a coherency state to be used for allocation of a given cache entry associated with an address in an associated address range indicated by the bounds information of the hint capability;

the cache control circuitry is configured to control, depending on the capability metadata specified by the hint capability, selection of a victim entry to be replaced in the at least one cache; and/or the cache control circuitry is configured to select, depending on reuse hint information specified by the capability metadata of the hint capability, at least one of: whether a cache entry should be allocated at all for data or instructions associated with addresses in a range indicated by bounds information specified by the capability metadata of the hint capability, and/or which of a plurality of cache levels of a cache hierarchy is a target cache level to be allocated with data or instructions for addresses in a range indicated by bounds information specified by the capability metadata of the hint capability.

* * * * *